United States Patent
Lah et al.

(10) Patent No.: US 8,123,197 B2
(45) Date of Patent: Feb. 28, 2012

(54) ETHYLENE PRODUCTION ISOLATION VALVE SYSTEMS

(75) Inventors: Ruben F. Lah, South Jordan, UT (US); Gary Larsen, West Jordan, UT (US)

(73) Assignee: Curtiss-Wright Flow Control Corporation, Falls Church, VA (US)

( * ) Notice: Subject to any disclaimer, the term of this patent is extended or adjusted under 35 U.S.C. 154(b) by 0 days.

(21) Appl. No.: 12/043,855

(22) Filed: Mar. 6, 2008

(65) Prior Publication Data
US 2008/0251749 A1 Oct. 16, 2008

Related U.S. Application Data

(60) Continuation-in-part of application No. 11/202,883, filed on Aug. 12, 2005, and a continuation-in-part of application No. 11/151,055, filed on Jun. 13, 2005, which is a continuation of application No. 10/442,673, filed on May 20, 2003, now Pat. No. 6,964,727, which is a continuation-in-part of application No. 09/946,917, filed on Sep. 5, 2001, now Pat. No. 6,565,714, application No. 12/043,855, which is a continuation-in-part of application No. 11/396,982, filed on Apr. 3, 2006, which is a division of application No. 10/096,301, filed on Mar. 11, 2002, now Pat. No. 6,660,131, which is a continuation of application No. 09/946,917, filed on Sep. 5, 2001, now Pat. No. 6,565,714.

(60) Provisional application No. 60/275,527, filed on Mar. 12, 2001.

(51) Int. Cl.
*F16K 3/00* (2006.01)

(52) U.S. Cl. .......................... 251/327; 251/195; 251/326
(58) Field of Classification Search .................. 251/194, 251/195, 326, 327, 328, 329; 137/15.13, 137/315.29, 315.3, 315.31, 315.32
See application file for complete search history.

(56) References Cited

U.S. PATENT DOCUMENTS 176,321 A 4/1876 Kromer
(Continued)

FOREIGN PATENT DOCUMENTS

JP 2000145989 5/2000
(Continued)

OTHER PUBLICATIONS

J. J. Kelley, "Applied Artificial Intelligence for Delayed Coking", Hydorcarbon Processing, Nov. 2000, 144-A-144-J, Gulf Publishing Company, USA.

(Continued)

*Primary Examiner* — John Fristoe, Jr.
(74) *Attorney, Agent, or Firm* — Kirton & McConkie; Michael F. Krieger

(57) ABSTRACT

The present invention provides more efficient, cost effective ethylene productions isolation valve devices and system as well as more efficient, cost effective methods for isolating the flow of matter from one location to another in an ethylene productions operation where the valve comprises a first seat; a second seat aligned with said first seat; a blind; a main body having an orifice dimensioned to align with an orifice in said line; wherein said main body is coupled to said line; an upper and lower bonnet coupled to said main body, wherein said bonnets may be removed in order to replace valve parts without separating the main body from the line; and a plate located inside a bonnet, wherein the plate comprises a planar surface that contacts a surface of the blind.

28 Claims, 22 Drawing Sheets

U.S. PATENT DOCUMENTS

| | | | |
|---|---|---|---|
| 1,656,355 A | 1/1928 | Huffmann | |
| 1,991,621 A | 2/1935 | Noll | |
| 2,064,567 A | 12/1936 | Riley | |
| 2,245,554 A | 6/1941 | Court | |
| 2,317,566 A | 4/1943 | Utterback | |
| 2,403,608 A | 7/1946 | Payne et al. | |
| 2,562,285 A | 7/1951 | Timmer | |
| 2,717,865 A | 9/1955 | Kimberlin, Jr. et al. | |
| 2,734,715 A | 2/1956 | Knox | |
| 2,761,160 A | 9/1956 | Manning | |
| 2,950,897 A | 8/1960 | Bryant | |
| 3,215,399 A | 11/1965 | McInerney et al. | |
| 3,367,625 A | 2/1968 | Fortune | |
| 3,379,623 A | 4/1968 | Forsyth | |
| 3,617,480 A | 11/1971 | Keel | |
| 3,646,947 A | 3/1972 | Rochelle et al. | |
| 3,716,310 A | 2/1973 | Guenther | |
| 3,837,356 A | 9/1974 | Selep et al. | |
| 3,852,047 A | 12/1974 | Schlinger et al. | |
| 4,062,516 A * | 12/1977 | Grove | 251/174 |
| 4,125,438 A | 11/1978 | Kelly et al. | |
| 4,174,728 A | 11/1979 | Usnick et al. | |
| 4,253,487 A | 3/1981 | Worley et al. | |
| 4,275,842 A | 6/1981 | Purton et al. | |
| 4,335,733 A | 6/1982 | Richards | |
| 4,410,398 A | 10/1983 | Chipman et al. | |
| RE31,439 E | 11/1983 | Rosensweig | |
| 4,492,103 A | 1/1985 | Naumann | |
| 4,503,594 A * | 3/1985 | Gall et al. | 29/890.142 |
| 4,531,539 A | 7/1985 | Jandrasi | |
| 4,611,613 A | 9/1986 | Kaplan | |
| 4,626,320 A | 12/1986 | Alworth et al. | |
| 4,666,585 A | 5/1987 | Figgins et al. | |
| 4,726,109 A | 2/1988 | Malsbury et al. | |
| 4,738,399 A | 4/1988 | Adams | |
| 4,771,805 A | 9/1988 | Maa | |
| 4,797,197 A | 1/1989 | Mallari | |
| 4,824,016 A | 4/1989 | Cody et al. | |
| 4,877,488 A | 10/1989 | Cody et al. | |
| 4,923,021 A | 5/1990 | Courmier et al. | |
| 4,929,339 A | 5/1990 | Elliott, Jr. et al. | |
| 4,960,358 A | 10/1990 | Digiacomo et al. | |
| 4,973,386 A | 11/1990 | Callegari et al. | |
| 4,993,264 A | 2/1991 | Cody et al. | |
| 5,004,152 A | 4/1991 | Baker et al. | |
| 5,022,266 A | 6/1991 | Cody et al. | |
| 5,022,268 A | 6/1991 | Wolf et al. | |
| 5,024,730 A | 6/1991 | Colvert | |
| 5,035,221 A | 7/1991 | Martin | |
| 5,041,207 A | 8/1991 | Harrington et al. | |
| 5,048,876 A | 9/1991 | Wallskog | |
| 5,059,331 A | 10/1991 | Goyal | |
| 5,107,873 A | 4/1992 | Clinger | |
| 5,116,022 A | 5/1992 | Genreith et al. | |
| 5,221,019 A | 6/1993 | Pechacek et al. | |
| 5,228,525 A | 7/1993 | Denney et al. | |
| 5,228,825 A | 7/1993 | Fruchtbaum et al. | |
| 5,299,841 A | 4/1994 | Schaefer | |
| 5,362,028 A * | 11/1994 | Jacobs | 251/327 |
| 5,417,811 A | 5/1995 | Malsbury | |
| H1442 H | 6/1995 | Edgerton et al. | |
| 5,446,223 A * | 8/1995 | Smith, Jr. | 585/313 |
| 5,464,035 A * | 11/1995 | Heinecke | 137/312 |
| 5,581,864 A | 12/1996 | Rabet | |
| 5,633,462 A | 5/1997 | Heaslip et al. | |
| 5,652,145 A | 7/1997 | Cody et al. | |
| 5,785,843 A | 7/1998 | Antalffy et al. | |
| 5,800,680 A | 9/1998 | Guerra | |
| 5,816,505 A | 10/1998 | Tran et al. | |
| 5,816,787 A | 10/1998 | Brinkerhoff et al. | |
| 5,876,568 A | 3/1999 | Kindersley | |
| 5,907,491 A | 5/1999 | Canada et al. | |
| 5,927,684 A | 7/1999 | Marx et al. | |
| 5,938,175 A * | 8/1999 | Young et al. | 251/329 |
| 5,947,674 A | 9/1999 | Malsbury et al. | |
| 5,974,887 A | 11/1999 | Cody et al. | |
| 6,007,068 A | 12/1999 | Dellacorte | |
| 6,039,844 A | 3/2000 | Malik | |
| 6,066,237 A | 5/2000 | Kindersley | |
| 6,113,745 A | 9/2000 | Maitland et al. | |
| 6,117,308 A | 9/2000 | Gangi | |
| 6,131,594 A * | 10/2000 | Staggs et al. | 137/1 |
| 6,223,925 B1 | 5/2001 | Malsbury et al. | |
| 6,228,225 B1 | 5/2001 | Meher-Homji | |
| 6,254,733 B1 | 7/2001 | Lu et al. | |
| 6,264,797 B1 | 7/2001 | Schroeder et al. | |
| 6,264,829 B1 | 7/2001 | Antalffy et al. | |
| 6,367,843 B1 | 4/2002 | Fetzer | |
| 6,539,805 B2 | 4/2003 | Heaslip et al. | |
| 6,547,250 B1 | 4/2003 | Noble et al. | |
| 6,565,714 B2 | 5/2003 | Lah | |
| 6,644,436 B2 | 11/2003 | Hofmann et al. | |
| 6,644,567 B1 | 11/2003 | Adams et al. | |
| 6,660,131 B2 * | 12/2003 | Lah | 202/245 |
| 6,738,697 B2 | 5/2004 | Breed | |
| 6,745,999 B1 * | 6/2004 | Heinecke et al. | 251/196 |
| 6,751,852 B2 | 6/2004 | Malsbury et al. | |
| 6,843,889 B2 | 1/2005 | Lah | |
| 6,926,807 B2 | 8/2005 | Bosi et al. | |
| 6,964,727 B2 | 11/2005 | Lah | |
| 6,989,081 B2 | 1/2006 | Lah | |
| 7,033,460 B2 | 4/2006 | Lah | |
| 7,037,408 B2 | 5/2006 | Wilborn et al. | |
| 7,115,190 B2 | 10/2006 | Lah | |
| 7,117,959 B2 | 10/2006 | Lah | |
| 7,316,762 B2 | 1/2008 | Lah | |
| 2002/0134658 A1 | 9/2002 | Lah | |
| 2002/0157897 A1 | 10/2002 | Hofmann et al. | |
| 2002/0166862 A1 | 11/2002 | Malsbury et al. | |
| 2002/0170814 A1 | 11/2002 | Lah | |
| 2003/0047153 A1 | 3/2003 | Kubel et al. | |
| 2003/0089589 A1 | 5/2003 | Malsbury | |
| 2003/0127314 A1 | 7/2003 | Bell et al. | |
| 2003/0159737 A1 | 8/2003 | Stares | |
| 2003/0185718 A1 | 10/2003 | Sellakumar | |
| 2004/0118746 A1 | 6/2004 | Wilborn et al. | |
| 2004/0154913 A1 | 8/2004 | Lah | |

FOREIGN PATENT DOCUMENTS

| | | |
|---|---|---|
| RU | 2043604 | 10/1995 |
| RU | 2163359 C1 | 2/2001 |
| SU | 558524 | 3/1984 |
| SU | 558524 A | 3/1984 |
| SU | 959413 | 3/1984 |
| SU | 959413 A | 3/1984 |
| WO | 0015985 | 3/2000 |

OTHER PUBLICATIONS

Claudio Allevato & Richard S. Boswell, "Assessing the Structural Integrity and Remaining Life of Coke Drums with Acoustic Emission Testing, Stain Gaging, and Finite Element Analysis," ETCE 99—Symposium on Plant and Facilities Reliability and Mechanical Integrity, 1999 Engineering Source Technology Conference & Exhibition, Stress Engineering Services, Inc.

Norm Lieberman, "Coke Drum Foam-Overs Causes & Cures," http://www.coking.com/Foamover.htm.

Paul J. Ellis & Christopher A. Paul, "Tutorial: Delayed Coking Fundamentals," AIChE 1998 Spring National Meeting's International Conference on Refinery Processes Topical Conference Preprints 1998, 1998, Great Lakes Carbon Corporation.

U.S. Appl. No. 10/731,874, Non-Final Rejection issued Feb. 23, 2005 by the United States Patent and Trademark Office. pp. 1-10.

U.S. Appl. No. 10/731,874, Final Rejection issued Jun. 28, 2005 by the United States Patent and Trademark Office. pp. 1-7.

U.S. Appl. No. 10/731,874, Examiner's search and strategy results issued Sep. 26, 2005. 1 page.

U.S. Appl. No. 10/731,874, Notice of Allowance of Fees Due, Issue Information, Index of Claims and Search information issued Sep. 29, 2005 by the United States Patent and Trademark Office; 7 pages.

U.S. Appl. No. 10/731,874, Notice of Allowance of Fees Dues, List of References, Issue Information, Search information and index of claims issued Jan. 18, 2006 by the United States Patent and Trademark Office; 10 pages.

U.S. Appl. No. 10/731,874, Non-Final Rejection issued Oct. 13, 2006 by the United States Patent and Trademark Office; 22 pages.
U.S. Appl. No. 10/731,874, Non-Final Rejection issued Apr. 6, 2007 by the United States Patent and Trademark Office; 14 pages.
U.S. Appl. No. 10/731,874, Requirement for Restriction/Election, List of References and index of claims issued Sep. 6, 2007 by the United States Patent and Trademark Office; 20 pages.
U.S. Appl. No. 10/731,874, Examiner's search strategy and results issued Dec. 5, 2007, 1 page.
U.S. Appl. No. 10/731,874, Non-Final Rejection issued Dec. 11, 2007 by the United States Patent and Trademark Office; 22 pages.
U.S. Appl. No. 10/997,834, Examiner's search strategy and results issued Jun. 22, 2005; 5 pages.
U.S. Appl. No. 10/997,834, Non-Final Rejection issued Jul. 6, 2005 by the United States Patent and Trademark Office; 44 pages.
U.S. Appl. No. 10/997,834, Examiner's search strategy and results issued Sep. 26, 2005; 1 page.
U.S. Appl. No. 10/997,834, Notice of Allowance and Fees, Issue Information, Index of Claims and search information issued Sep. 29, 2005 by the United States Patent and Trademark Office; 8 pages.
U.S. Appl. No. 10/411,849, Examiner's search strategy and results issued Aug. 4, 2005; 5 pages.
U.S. Appl. No. 10/411,849, Non-Final Rejection issued Aug. 9, 2005 by the United States Patent and Trademark Office; 8 pages.
U.S. Appl. No. 10/411,849, Non-Final Rejection issued Feb. 8, 2008 by the United States Patent and Trademark Office; 7 pages.
U.S. Appl. No. 10/411,849, Examiner's search strategy and results issued Jul. 18, 2006; 1 page.
U.S. Appl. No. 10/411,849, Notice of Allowance and Fees Due, Examiner Interview Summary Record, Issue Information, Index of Claims, Search Information and Bibliographic Data Sheet issued Jul. 24, 2006 by the United States Patent and Trademark Office; 14 pages.
U.S. Appl. No. 10/997,234, Examiner's search strategy and results issued Mar. 14, 2006; 3 pages.
U.S. Appl. No. 10/997,234, Non-Final Rejection issued Mar. 20, 2006 by the United States Patent and Trademark Office, 13 pages.
U.S. Appl. No. 10/997,234, Examiner's search strategy and results issued Aug. 4, 2006; 1 page.
U.S. Appl. No. 10/997,234, Notice of Allowance and Fees Due, Issue Information, Bibliographic Data Sheet, Index of Claims and Search Information issued Aug. 10, 2006 by the United States Patent and Trademark Office, 8 pages.
U.S. Appl. No. 10/412,628, Non-Final Rejection issued Feb. 16, 2007 by the United States Patent and Trademark Office; 17 pages.
U.S. Appl. No. 10/412,628, Notice of Allowance and Fees Due, Bibliographic Data Sheet, Index of Claims, Search Information and Issue Information issued Aug. 24, 2007 by the United States Patent and Trademark Office; 11 pages.
U.S. Appl. No. 10/873,022, Non-Final Rejection issued Jul. 7, 2005 by the United States Patent and Trademark Office, 12 pages.
U.S. Appl. No. 10/873,022, Notice of Allowance and Fees Due, Specification and Issue Information issued Jan. 4, 2006 by the United States Patent and Trademark Office, 9 pages.
U.S. Appl. No. 10/274,280, Examiner's search strategy and results issued Mar. 14, 2004; 2 pages.
U.S. Appl. No. 10/274,280, Non-Final Rejection issued Mar. 25, 2004 by the United States Patent and Trademark Office; 10 pages.
U.S. Appl. No. 10/274,280, Notice of Allowance and Fees Due, Issue Information and Bibliographic Data Sheet issued Oct. 5, 2004 by the United States Patent and Trademark Office; 8 pages.
U.S. Appl. No. 10/442,673, Examiner's search strategy and results issued Aug. 26, 2004, 2 pages.
U.S. Appl. No. 10/442,673, Non-Final Rejection issued Sep. 1, 2004 by the United States Patent and Trademark Office; 10 pages.
U.S. Appl. No. 10/442,673, Final Rejection issued Feb. 23, 2005 by the United States Patent and Trademark Office; 6 pages.
U.S. Appl. No. 10/442,673, Notice of Allowance and Fees Due, Amendment After Final, Issue Information, Index of Claims and Search Information issued Apr. 20, 2005 by the United States Patent and Trademark Office; 10 pages.
Zappe, R.W., Valve Selection Handbook, Fourth Edition, Gulf Publishing Company, Houston, Texas.

* cited by examiner

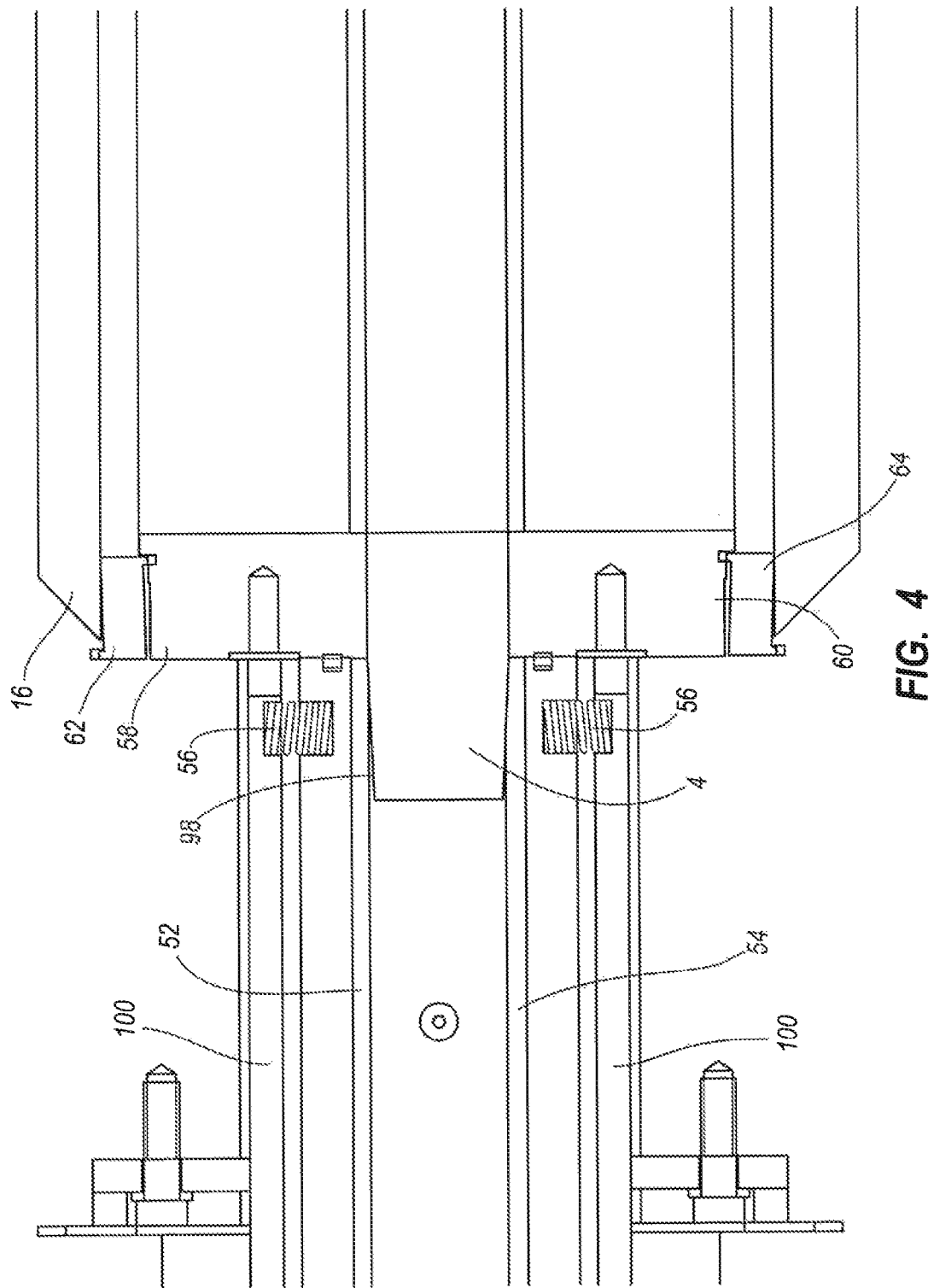

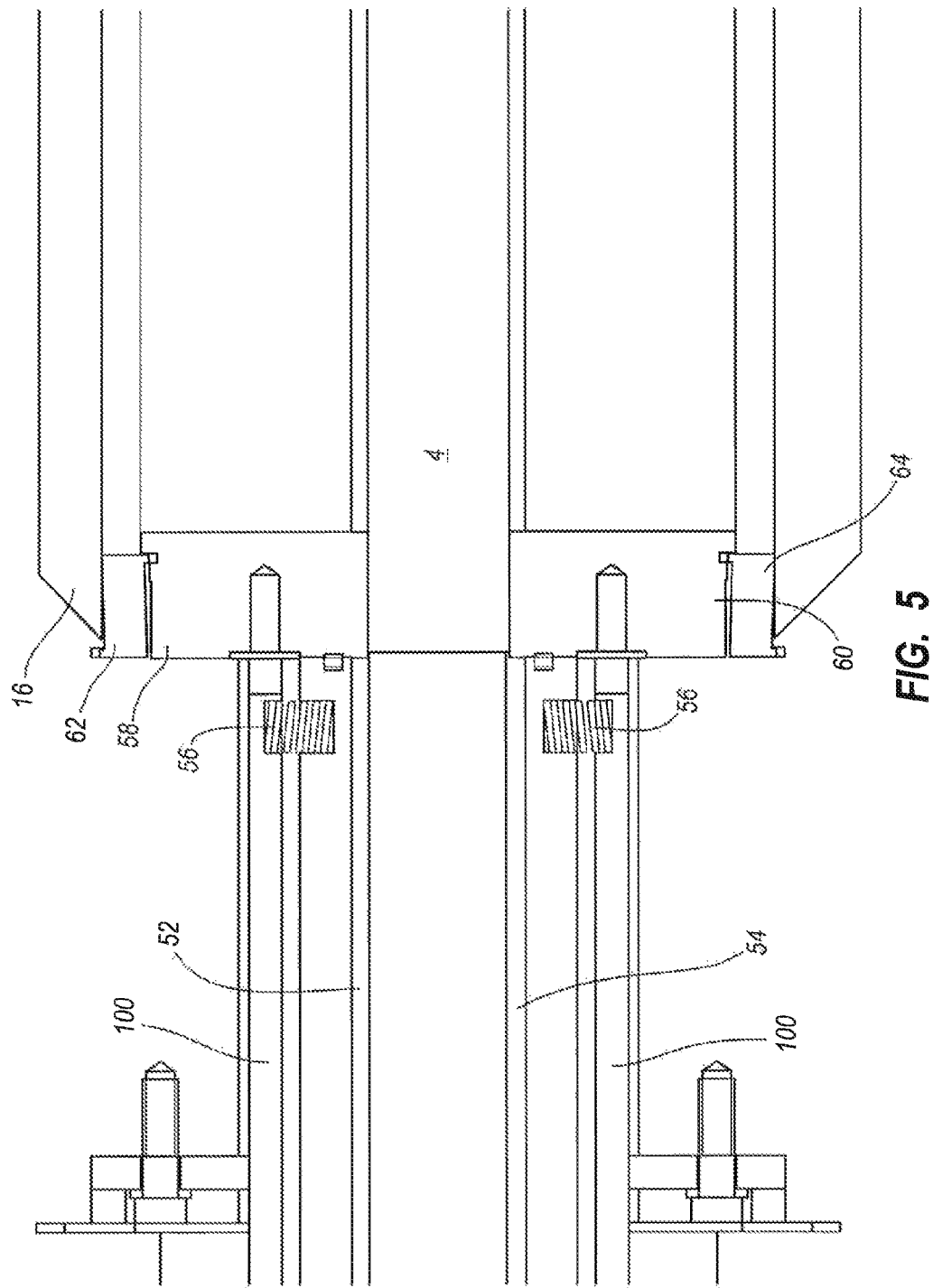

US 8,123,197 B2

ETHYLENE PRODUCTION ISOLATION VALVE SYSTEMS

RELATED APPLICATIONS

This application is a continuation-in-part of U.S. patent application Ser. No. 11/202,883 filed Aug. 12, 2005 entitled, "DELAYED COKER ISOLATION VALVE SYSTEMS", and is a continuation-in-part of U.S. patent application Ser. No. 11/151,055 filed Jun. 13, 2005 entitled, "Coke Drum Bottom De-heading System", which is a continuation of U.S. patent application Ser. No. 10/442,673, now U.S. Pat. No. 6,964,727 filed May 20, 2003 entitled, "Coke Drum Bottom De-heading System", which is a continuation-in-part of U.S. patent application Ser. No. 09/946,917, now U.S. Pat. No. 6,565,714, filed Sep. 5, 2001 entitled, "Coke Drum Bottom De-heading System", which claims priority to U.S. Provisional Patent Application Ser. No. 60/275,527 filed Mar. 12, 2001 entitled "Coke Drum Bottom De-heading System". This application is additionally a continuation-in-part of U.S. patent application Ser. No. 11/396,982 filed Apr. 3, 2006 entitled, "Valve System and Method for Unheading a Coke Drum", which is a divisional of U.S. patent application Ser. No. 10/096,301, now U.S. Pat. No. 6,660,131, filed Mar. 11, 2002 entitled, "Improved Coke Drum Bottom De-heading System", which is a continuation of U.S. patent Application Ser. No. 09/946,917, now U.S. Pat. No. 6,565,714, filed Sep. 5, 2001 entitled, "Coke Drum Bottom De-heading System", which claims priority to U.S. Provisional Patent Application Ser. No. 60/275,527 filed Mar. 12, 2001 entitled "Coke Drum Bottom De-heading System".

BACKGROUND

1. Field of the Invention

The present invention relates to ethylene production operations. Specifically, the present invention relates to isolation valves used in a ethylene production operation.

2. Background

Ethylene belongs to a class of compounds known as alkenes, or commonly referred to as olefins. Ethylene is the largest volume petrochemical produced worldwide. It is used almost exclusively as an intermediate in the production of several industrial chemicals. For example, ethylene may be used in one of several forms of polyethylene, as ethylene glycol to make polyester, in the manufacture of vinyl acetate and vinyl chloride, as a building block for linear alpha olefins, and in the production of styrene.

Several commercialized methods are practiced to synthesize olefins. The majority of commercially produced ethylene is produced by thermal cracking petroleum hydrocarbons with steam. The process is commonly referred to as pyrolysis or steam cracking. Steam crackers can produce ethylene from numerous hydrocarbon feeds including natural gas liquids, light petroleum gases, light paraffinic naphthas, and mixtures thereof. In typical ethylene production the feedstock is heated by heat exchange to between 500-600 degrees Celsius. The feedstock is then mixed with steam. The steam mixed feedstock enters a heated tubular reactor, commonly referred to as a radiant tube or radiant coil where it is heated from 500-600 degrees Celsius to between 700 and 900 degrees Celsius for between 0.1 and 0.5 seconds. The hydrocarbons in the feedstock are cracked during this short period of time into smaller molecules including ethylene. The smaller molecules leave the radiant tube and enter a transfer line exchanger where they are cooled to 500-700 degrees Celsius within 0.01 and 0.1 seconds to prevent degradation of the desired products.

As feedstock is heated in the tubular reactors pyrolytic coke is produced. Some of the coke accumulates on the walls of the furnace tubes. Within the furnace tubes, the coke deposits on the wall of the tube and because the coke is a thermal insulator, it prevents efficient heat transfer from the furnace firebox to the reacting gas within the tubes. To compensate for this the furnace is fired harder. Additionally, the effective coil diameter is reduced by increasing deposition of the coke on the tubes inside surface, thus raising the pressure drop across the coil. Consequently, the furnace inlet pressure must be raised. Both effects are detrimental when optimizing ethylene yield.

During the process, less than 100 percent of the feed is converted per pass because of thermodynamic limitations and in order to maximize the yield of the desired olefin product. Separation equipment is used to recover the unreacted feed from the olefin products and byproducts. The unconverted feed is recycled where it is often remixed with fresh feed.

A furnace must be periodically cleaned to remove the accumulated coating of coke. This cleaning is referred to as decoking. In some cases furnace tubes must be cleaned as often as once every ten days. During each decoking cycle a furnace must be isolated from and reconnected to the flow of feedstock, recycled feed stock and steam, and ports that allows lighter fractions produced during cracking to escape from the vessel back to the fractionator. Accordingly, a series of isolation valves must be utilized to control the flow of feed stock, ethylene, steam and other furnace by-products to facilitate decoking of the furnace tubes and to allow unconverted feed stock to be recycled back through the furnaces. However, debris or other matter may build up on the internal components of the valves which then become inoperable. Each decoking cycle and any valve maintenance or repair represents non-productive downtime for the furnace. Accordingly, minimizing costly down-time by installation of robust isolation valves, which allow for long term, repeatable, secure opening and closing, under adverse environmental conditions, of various lines throughout an ethylene production facility is desirable.

SUMMARY

The present invention provides isolation valve devices and systems for isolating the flow of matter in a line connecting one location to another in an ethylene production operation comprising a first seat; a second seat aligned with said first seat; a blind; a main body having an orifice dimensioned to align with an orifice in said line; wherein said main body is coupled to said line; an upper and lower bonnet coupled to said main body, wherein said bonnets may be removed in order to replace valve parts without separating the main body from the line; and a plate located inside a bonnet.

Some embodiments of the invention comprise a flange for attaching the valve to a line; a first seat; a second seat aligned with said first seat; and a blind, said blind capable of moving in a bidirectional manner within said line between said first seat and said second seat to control the opening and closing of the isolation valve.

Some embodiments of the present invention comprise: a) an isolation valve coupled to a line in the ethylene production unit operation where in said line may be an inlet resid feed line, a vapor line and/or other various lines utilized in the ethylene production unit operation to move matter from one location to another wherein the valve comprises: 1) a main body having an orifice dimension to align with the line when the isolation valve is coupled thereto; 2) a valve closure operably supported by the main body, wherein the valve closure is capable of being actuated to oscillate between an open and closed position with respect to the orifice of the isolation valve and the port of the line; 3) means for supporting the isolation valve closure; a) seat between the valve closure and the means for supporting the valve closure which contributes to the valve isolation, wherein the seat additionally functions to sheer any coke or by-product material that has accumulated near the isolation valve thus effectively cleaning the isolation valve upon actuation of the valve closure; and b) a means for actuating the valve closure; 4) an upper and lower bonnet coupled to said main body, wherein said bonnet may be removed in order to replace valve parts without separating the main body from the line; and one or more plates located inside a bonnet wherein the plate(s) comprise a planar surface that may contact one or more surfaces on the blind.

The isolation valves of the present invention produce several advantages over the prior art isolation valves. In some embodiments, for example, the isolation valves of the present invention decrease the likelihood of coking up, or oiling during the course of repetitive decoking cycles. Accordingly, in some embodiments the valves of the present invention may be operated for extended periods of time without decreased performance. The features of some of the embodiments the present invention overcome the likelihood that coke, oil or other debris will build up on the internal parts of the valve, allowing the valve of the present invention to continue to operate through repetitive cycles. Additionally, in some embodiments of the present invention one of the valves of the present invention may replace two prior art valves, obviating the need to utilize a double block and bleed system. Because the features of the present invention allow the isolation valve to be reliably used over an extended period of time without decrease in performance, the valve of the present invention may replace two isolation valves in an existing line.

Additionally, some embodiments of the present invention allow for inline serviceability. That is some embodiment of the invention allow for leaving the main body of an isolation valve inline to service, inspect, replace, and or repair various internal components of the isolation valve system.

Additionally, some embodiments of the present invention comprise performance feedback monitoring. The ability to monitor the efficiency of the one valve inline may be monitored by various performance feedback monitoring systems.

Additionally, some embodiments of the present invention provide the advantage of allowing a valve to be held in a partially open position for a substantial period during the ethylene coking operation. For example, the valves in an ethylene coker unit operation are often in a partially open position. The internal shrouding mechanism of the present invention prevents the build up of coke or other matter inside the shroud and on the various internal components of the shroud system. Accordingly, the isolation valve of the present invention may be maintained in a partially opened position for nearly indefinite periods of time without affecting the performance of the valve system or its ability to be opened or closed.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

FIG. 4 illustrates a close up view of the lower bonnet system wherein the valve is in an open position;

FIG. 5 illustrates an embodiment of the valve wherein the valve is in a closed position particularly depicting the lower bonnet

DETAILED DESCRIPTION OF THE INVENTION

It will be readily understood that the components of the present invention, as generally described and illustrated in the figures herein, could be arranged and designed in a wide variety of different configurations. Thus, the following more detailed description of the embodiments of the system, device, and method of the present invention, as represented in FIGS. 1 through 8, is not intended to limit the scope of the invention, as claimed, but is merely representative of some of the embodiments of the invention.

Embodiments of the invention will be best understood by reference to the drawings wherein like parts are designated by like numerals throughout. Although reference to the drawings and a corresponding discussion follow below, the following more detailed description is divided into sections. The first section pertains to and sets forth a general discussion of the ethylene production process. The second section pertains to and sets forth the isolation valve system, including the variety of valves or valve-types that may be utilized in the ethylene production process, as well as the various methods for utilizing the system within an ethylene production or other similar environment. It is noted that these sections are not intended to be limiting in any way, but are simply provided as convenience to the reader.

For the purposes of the present application the term "line" shall mean a conduit through which matter flows. Cutting-water inlet line, overhead vapor line, blowdown line, module switching line, back-warming line, fractionator line, drum bypass line, heater charge pump discharge line, resid inlet line, switch manifold line, pre-heat warm up line, quench water line, steam inlet line, drain-to-pit line and/or any other type of lines through which matter, including any fluid, gas and/or solid may or does pass during delay coker operation are examples of lines contemplated by the present invention.

1. General Discussion on the Ethylene Production Process

In the typical ethylene production process, petroleum is fed to one or more tube furnaces where the petroleum is thermally cracked into ethylene and other light products. The furnaces are typically large vessels having a circuitous tube placed therein. Coke is a byproduct of the process, and often lines the tubes within the furnace. The process is temperature-sensitive with the varying temperatures and pressures producing varying products. A furnace is used in the process to reach thermal cracking temperatures, which range upwards of 1,000° F.

Figure 1:
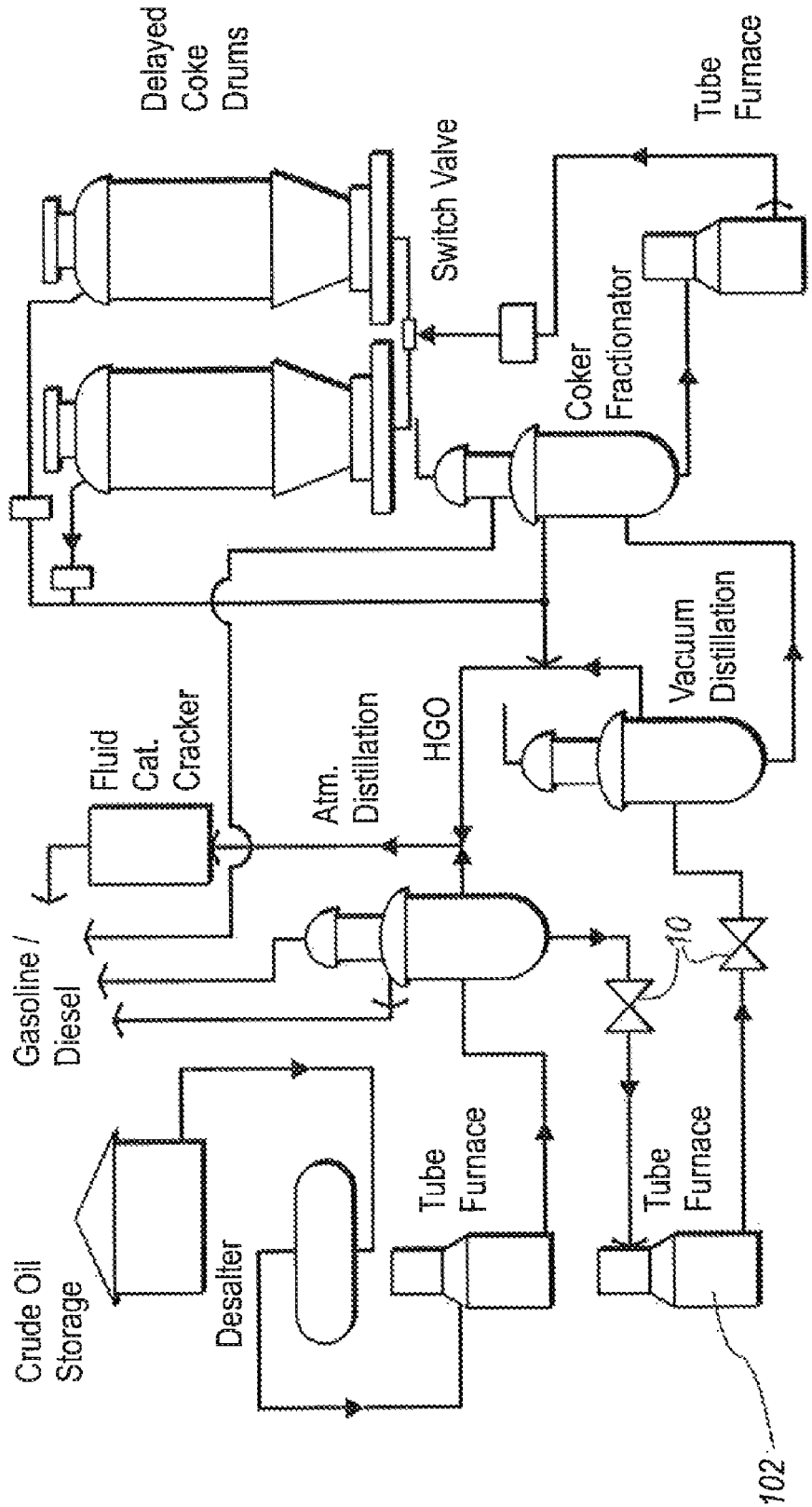
FIG. 1 illustrates, generally, an exemplary ehtylene coker unit operation, wherein refinery byproducts are routed to a series of tube furnaces for the manufacture of ethylene, and wherein the system is equipped with the isolation valves of the present invention.

A basic refinery flow diagram is presented as FIG. 1, with several furnaces shown. The ethylene production process typically comprises a batch-continuous process, which means that the process is ongoing or continuous as the feed stream going into the furnace alternates is not interrupted except for maintenance.

2. Isolation Valve System

Although the present invention is intended to cover the use of isolation valves throughout an ethylene production system, or rather the isolation system of the present invention may be utilized to control the flow of matter, including any fluids, solids and/or gases, at any point in the operation, one ordinarily skilled in the art will recognize that the valve as explained and described herein may also be designed and used in other environments where controlling the movement of matter, including fluids, solids and/or gases, is desirable.

The specification describes a valve system and method for isolating the flow of a substance during the ethylene production process. As the present invention is especially adapted to be used in the ethylene production process, the following discussion will relate specifically in this manufacturing area. It is foreseeable however; that the present invention may be adapted to be an integral part of other manufacturing processes producing various elements or by-products other than coke, and such processes should thus be considered within the scope of this application.

Prior to reciting the specifics of the present invention, it should be noted that the present invention system and method is designed to have or possess significant functional, utility, and safety advantages over prior related designs and systems. These should be kept in mind when reading the following detailed disclosure.

The present invention provides isolation valve devices and systems for isolating the flow of matter from one location to another through a line in an ethylene production unit operation comprising a first seat; a second seat aligned with said first seat; a blind; a main body having an orifice dimensioned to align with an orifice in said line; wherein said main body is coupled to said line; an upper and lower bonnet coupled to said main body, wherein said bonnets may be removed in order to replace valve parts without separating the main body from the line; and a plate located inside a bonnet, wherein the plate comprises a planar surface that contacts a surface of the blind.

Some embodiments of the present invention comprise: a) an isolation valve coupled to a line in the ethylene production unit operation where in said line may be an inlet resid feed line, a vapor line and/or other various lines utilized in the ethylene production unit operation to move matter from one location to another wherein the valve comprises: 1) a main body having an orifice dimension to align with the line when the isolation valve is coupled thereto; 2) a valve closure operably supported by the main body, wherein the valve closure is capable of being actuated to oscillate between an open and closed position with respect to the orifice of the isolation valve and the port of the line; 3) means for supporting the isolation valve closure; a) a contact between the valve closure and the means for supporting the valve closure which contributes to the valve isolation, wherein the contact seal additionally functions to sheer any coke or by-product material that has accumulated near the isolation valve thus effectively cleaning the isolation valve upon actuation of the valve closure; and b) a means for actuating the valve closure; 4) an upper and lower bonnet coupled to said main body, wherein said bonnet may be removed in order to replace valve parts without separating the main body from the line; and one or more plates located inside a bonnet wherein the plate(s) comprise a planar surface that may contact one or more surfaces on the blind.

The isolation valve of the present invention may be connected to any line in the ethylene production operation. Examples of some embodiments of the present invention are cutting-water isolation valve, overhead vapor isolation valve, blowdown isolation valve, module isolation valve, back-warming isolation valve, fractionator isolation valve, drum bypass isolation valve, heater charge pump discharge isolation valve, inlet isolation valve, switch manifold isolation valve, pre-heat warm up isolation valve, quench water isolation valve, steam isolation valve, and drain-to-pit isolation valve.

In some embodiments the isolation valve may be coupled to and seal against a portion of the lines of a ethylene production unit operation in much the same way a conventional isolation unit would be attached. The following discussion treats the use of isolation valves in relation to inlet resid feed lines and/or vapor lines. However, as previously noted the isolation valves of the present invention may be utilized in a substantial number of points throughout the ethylene production unit operation. Accordingly, limiting the following discussion to the use of the present invention in the resid feed lines and/or vapor lines is intended to clarify and simplify the following discussion and is not intended to limit the scope of the application of the present invention. The valves of the present invention may be utilized at all of the points in the ethylene production unit operation previously mentioned, at many other points in ethylene production unit operations and may be utilized as isolation valves in systems unrelated to ethylene production unit operations.

In some embodiments the isolation valve is equipped with a valve closure that regulates the closing and opening of a line, for example the inlet feed line and/or the vapor lines, or regulates the opening and closing of the line, for example inlet feed line and/or the vapor lines and their associated throughput. When the isolation valve is in a closed position it blocks the flow of matter through the line. Thus, for example, in a closed position isolation valve 100 blocks the flow into the tube furnace 102 and/or blocks the movement of lighter fractions/steam/gas from entering the vacuum distinction unit.

When the isolation valve is attached to a line and moved into an open position matter is allowed to move through the line. For example, when the isolation valve, attached to the feed line, is moved into an open position by an actuator, feed gas is allowed to flow through the inlet feed line. When the isolation valve is moved into an open position by an actuator the lighter fractions emitted during the cracking process including steam and gas are allowed to move out of the furnace through the line and be transported to other furnaces, enter the fractionation tower or distillation units. In some embodiments, this opening action additionally functions to sheer any debris that accumulates on the valve or near the port thus effectively allowing the isolation valve to be repetitively opened and closed and to maintain a seal. Accordingly, the valve of the present invention allows for reliable use of a valve over an extended period of time without any significant decrease in performance. Since the valve does not allow gases to enter the bonnets or interior parts of the valve, coke dust cannot fill the internal components of the valve causing sticking or binding.

An advantage of some of the embodiments of the present invention is their ability to provide a simple yet effective isolation valve system comprising an isolation valve having a movable valve closure that oscillates and moves back and forth about a means for supporting the valve closure to isolate the flow of matter including residuum/gas/steam and/or other matter and fluids. In some embodiments of the invention the valve allows for one valve to replace two valves inline. In particular, prior art isolation systems typically utilize a double block and bleed system, which requires the use of two valves. An advantage of some of the embodiments of the present invention includes the potential of the present valve to replace two valves previously in place in any given line wherein a double block and bleed method for isolation have previously been utilized. Prior art systems typically utilized the double block and bleed systems as a means of ensuring the performance of the seal formed by the valves. Some embodiments of the present invention ensure performance by utilizing one or both of the following: a more sophisticated valve which prevents decreased performance over time; and the inclusion of performance monitoring equipment to provided feedback allowing an operator to ensure the continued seal performance at any given time. Accordingly, the process of isolating the flow of matter through a line is simplified.

Another advantage of some of the embodiments of the present isolation valve system is its ability to be utilized at various points in the ethylene operation. For example, the isolation valve may be used to regulate the flow in the lines from the vacuum distillation unit to the bottom of the fractionation tower. For example, the valve of the present invention may be utilized to isolate the flow of water through a line to the drain stem; to isolate the flow of gases or fluids through the blow down line attached to the overhead vapor lines. In some embodiments of the invention the isolation valve may be utilized to isolate the flow of fluid or gases through the back warming line or to act as a valve in the module isolation line. In additional embodiments of the present invention, the valve may be utilized to isolate the flow of matter through a furnace bypass line, a switch manifold line, a preheat warm up line, a quench water line, a steam line, a drain-to-pit line and any other lines utilized in the ethylene production unit operation.

The valve of the present invention possess the ability to isolate gases and hot liquids particularly those utilized in the ethylene production operations. Accordingly, in some embodiments the valves of the present invention provide the benefit of allowing for reliable, extended flow isolation without decreased performance. In some embodiments the maintenance of high performance over extended periods of time is enhanced by features of the invention including contact between the seats and blind which acts to remove any debris from the internal component of the valve system. In prior art systems the likelihood of coking up or oiling up required frequent rebuilds and therefore removal of isolation valves from a given line. Because the seats in some embodiments of the present invention contact the blind in a manner that removes debris and/or built up coke from the blind and seats of the valve of the present invention maintains high levels of performance over extended periods of time.

Additionally, in some embodiments of the present invention the main body of the valve is coupled to the upper and lower bonnets, which may be removed to replace valve parts without separating the main body from the line. Within the bonnets of some embodiments of the present invention there are plates located in opposition to one another which allow the blind to maintain surface contact with the plates. The plate/blind system located within the bonnets of the present invention prevent the escape of matter from a line into the bonnet. Accordingly, some embodiments of the invention prevent the exposure the internal elements of the valve system to matter traveling through the line. Consequently, the internal components of the present valve system remain clean and free from debris and build up.

In some embodiments the internal sealing components of the isolation valve of the present invention may be replaced by removing a top bonnet while the main body remains attached to the orifice dimension aligned to a particular line, including inlet resid feed lines and/or to the vapor line leading toward the fractionation tower. Accordingly, in some embodiments the valve parts may be replaced without removing the valve from the line.

Some embodiments of the invention utilize a means for supporting a valve closure comprising seat support systems. The seat support systems may comprise an arrangement or configuration of seats depending upon the type of valve. In some embodiments the means for supporting the valve closure comprises a seat support system, which is comprised of an upper and lower seat existing on either side of the valve closure wherein the upper seat and the lower seat may be independent from one another. The upper and lower seats may be comprised of either static or dynamic nature, such that one may be static and the other dynamic, both dynamic, or both static. Alternatively, the seat support system may be comprised of a single seat situated or disposed between the main body of the isolation valve and the valve closure. In this configuration, this single seat applies continuous force to the valve closure throughout its oscillation. The single seat may be floating or dynamic or it may be static again depending upon the type of valve and the needs of the system specification and any other contributing factors.

Some embodiments of the seat system utilize at least one dynamic live loaded seat. In these embodiments the live loaded seat is continuously loaded against the valve closure to create a biased relationship between the seat and the valve closure. In some embodiments of the present invention the floating live loaded seat is molded against the valve closure to create a balanced relationship between the seat and the valve closure. In some embodiments the live loaded seat is accomplished using one or a combination of biased members such as heavy coiled springs arranged at core centers around the perimeter of the seat ring; machine washers which create a biased relationship between the seat and valve closure; and/or externally live-loaded and sealed seat force applicators raised at quadrants around the floating seat. In some embodiments, the seat support system may be provided by utilizing machine washers capable of being exposed to hot fluids. In some of the embodiments of the present invention the means of supporting the valve closure comprises the main body itself. In this embodiment, no seats are required as structural modifications can be made to the main bodies to support the valve closure.

In some embodiments the continuously maintained contact seal comprises a sealing system that seals directly to the valve closure. This may be a point-to-point sealing system. In some embodiments the seal preferably consists of, or is a result of, metal-to-metal seating between the valve closure, and the means for supporting the valve closure such as the upper and lower seats. In some embodiments the valve closure and means for supporting the valve closure remain in contact as the valve closure oscillates between its opened and closed positions. In some embodiments the amount of force required to properly seal the valve closure and the means for supporting the valve closure is provided by a seat support system wherein one or more of the seats may be floating or dynamic seat. In some embodiments the amount of force required to properly seal the valve closure and the means for supporting the valve closure is provided by a seat support system wherein one or more of the seats may be floating or dynamic seat coupled to a seat adjustment mechanism designed to control the amount of force exerted on the valve closure through a valve seat.

Some embodiments of the isolation valve system further comprise a steamed purge system. The system utilizes pressure valves and steam purge inlet valves as well as emergency vent valves to control the pressure within the system.

Some embodiments of the isolation valves of the present invention further comprise an internal gas/liquid containment system that provides or maintains isolation of the fluid including gas within the system. The internal fluid containment system comprises the metal-to-metal contact seal described herein as well as a unique component configuration existing within the bonnets of the isolation valves.

The system of many of the embodiments of the present invention are capable of automatic and repeated line isolation without needing repair or replacement. In several embodiments of the present invention, the isolation valve may be fixed or coupled directly to the line flange. In some embodiments of the present invention, the system is designed and constructed in a way to ensure long term operation without clogging or being operationally obstructed by coke particles, oil, resid, or any other foreign matter and debris. In some embodiments of the present invention, the system is designed to be able to demonstrate, with absolute certainty, at all times and at all local and remote locations that it is positively isolating. In several embodiments of the present invention, the system is virtually maintenance free except for long term parts replacement during scheduled shutdowns. Consequently, there are virtually no maintenance costs beyond the scheduled maintenance times.

In some of the embodiments of the present invention the internal components including the seats and blind may be inspected, repaired and/or replaced without detaching the main body of the valve from the line. For example the entire valve system does not need to be removed from the line to replace any of the elements of the system.

In some embodiments of the present invention, the isolation valve and system comprises a steam purged body that utilizes regulates body temperature, and that creates a barrier against gas, fluid, and solid migration. The steam purge elements of these embodiments prevent the movement of matter into the upper and lower bonnets from the line. Accordingly, the internal components of the present invention do not become encumbered by coke or oil build up. The clean the internal components require significantly less repair and replacement. Accordingly, the valve of the present invention operates reliably for extended periods of time without decreased performance.

In some embodiments of the present invention, the system comprises a simple, hydraulic design with one hydraulic power unit and one cylinder, and one supply and one return hydraulic line. Still further, some embodiments comprise a compact hydraulic backup device to allow the valve to open or close even when the primary actuation device has failed.

Some embodiments of the present invention comprise a simple redundant hydraulic design as described above. Some embodiments of the system also comprise one major moving part instead of multiple moving parts as found on existing devices and systems. This significantly increases the ease of operation, as well as the durability of the system because there is less that can go wrong or less moving parts that can malfunction. Moreover, the isolation and containment of the residuum, gases, steam and/or other materials provide a clean operating atmosphere that contributes to the durability and robust nature of the system.

In some embodiments of the present invention the internal components of the bonnet prevent the build up of oil, coke, or debris inside the bonnet. Accordingly, because some of the embodiments of the present invention have particular design features the internal components of the valve system are not exposed to oil, coke, and/or other build up while the valve is maintained in a partially opened condition. For example, some embodiments of the present valve system utilize a steam purge system as previously discussed which creates a positive pressure inside of the bonnet forcing the content of a line to remain inline and prevent the content of the line from moving into the internal components of the valve.

There are additional mechanical features of some of the embodiments of the present invention which allow the valve to be maintained in a partially opened position without comprising the performance of the valve over extended periods of time. For example, in some embodiments the seat system maintains continuous contact with the gate of the present invention. The continuous contact in some embodiments, shears accumulated coke and/or other debris preventing the accumulated material from building up upon the valve itself and from falling into the various internal components of the valve system. Some embodiments of the present invention utilize a system, which is located inside the bonnet, which maintain contact with the gate of the valve while the gate moves through the open and closed positions. In some embodiments the bonnet, preferably the lower bonnet of the valve, contains one or more plates which opposably face each other and are biased against the surface of the gate present within the lower bonnet. In some embodiments springs coiled and biased against the lower bonnet lie between the bonnet and the plate. Accordingly, the spring system of some embodiments of the present invention press the plate located in the lower bonnet against the surface of the gate. The plate system located in the bonnet system prevents the movement of gases, fluids, or solid matter from the line into the bonnet. Accordingly, the plate system prevents the contents of the line from coming into contact with the internal elements of the gate system.

Turning to the Figures of the present invention and a more detailed analysis of some of the embodiments of the invention, FIG. 1 depicts, generally, a petroleum manufacturing and refinery process having several elements and systems present. In addition to these elements, petroleum manufacturing and refinery process 8 further comprises multiple isolation valve systems 100 in positions relative to a tube furnace 102 In a batch-continuous operation, the refinery maintains continuous uninterrupted operation. Although FIG. 1 is illustrative of a petroleum manufacturing and refinery process having two tube furnaces in series, and although the discussion and some embodiments illustrated, described, and discussed herein focus on line isolation systems, one ordinarily skilled in the art will recognize that the present invention may be applicable or adapted to a number of different processes in which a function similar to the ethylene production process is present.

Figure 2:
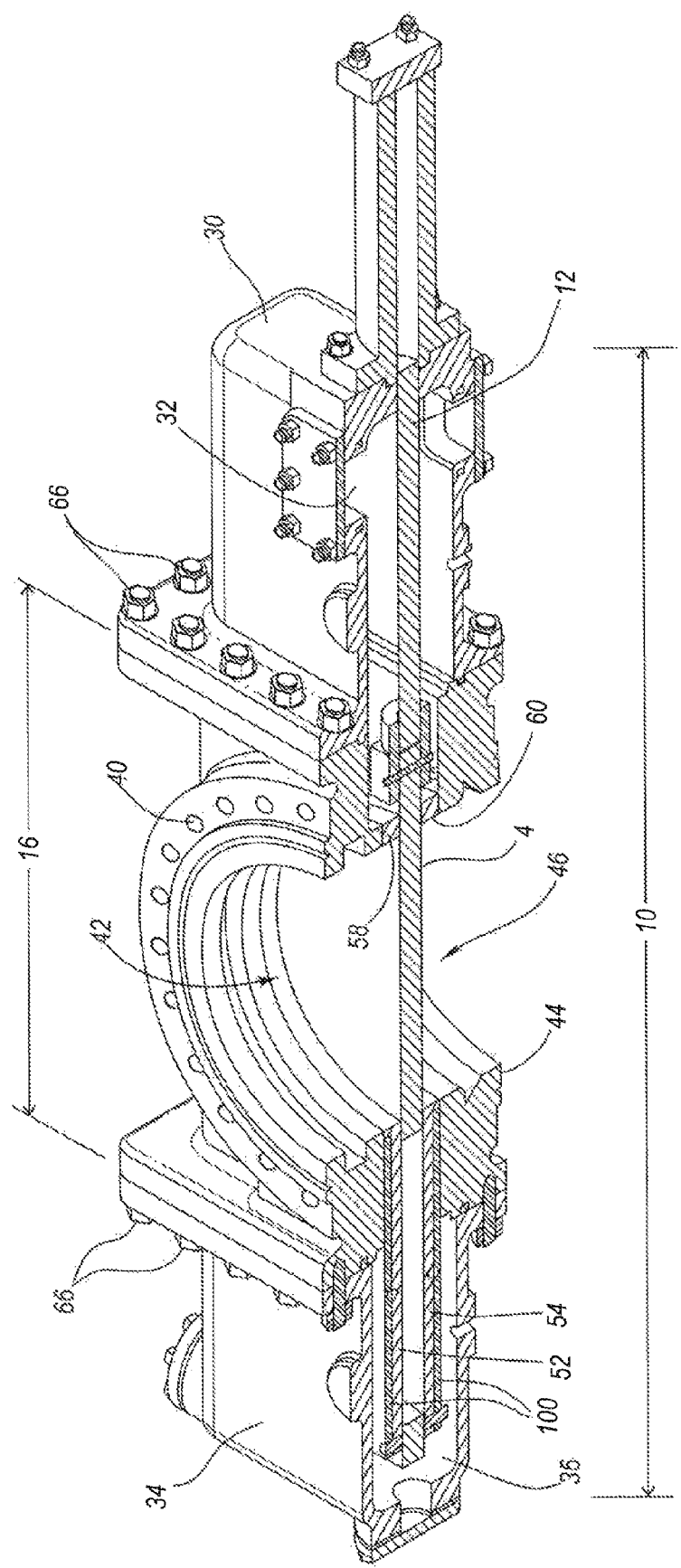
FIG. 2 illustrates a cutaway of some embodiments of an isolation valve of the present invention in a closed position.

FIG. 2 depicts an embodiment of the isolation valve system of the present invention. The depicted isolation valve system comprises an isolation valve 100 that couples to a line. In some embodiments, the valve as depicted may be connected one or more of the above described positions in the ethylene production unit operation.

The isolation valve depicted in FIGS. 2-5 is an embodiment of the isolation valve of the present invention.

Means for supporting the valve closure 50 (e.g., the dual, metal seat surfaces in some embodiments), the bonnet interior 36, and all internal parts are fully protected and isolated from any matter flowing through a line while the valve is in the fully open, fully closed or partially opened positions. Preferably the materials used in the construction of sealing parts are resistant to corrosion, and are designed for exceptionally high metal to metal cycle duty. The seals of the isolation valve are designed to cleanly break the bond between the coke and the exposed surface of the valve closure at each stroke. The total thrust required for this action combined with the thrust required to overcome seating friction and inertia is carefully calculated and is accomplished by actuating the valve closure, thus causing it to relocate or transition from a closed to an open position.

FIGS. 2-5 illustrate various views of an isolation valve 100, according to one embodiment of the present invention. The depicted isolation valve 100 comprises a main body 16 coupled to upper and lower bonnets 30 and 34, each comprising upper and lower chambers 32 and 36, respectively. Main body 16 comprises a first flange portion 40 having an opening or port 42 therein, and a second flange portion 44 having an opening or port 46 therein. Main body 16 couples 26 to a complimentary flange portion and associated opening or port of a line 2, such that each opening is concentric and/or aligned with one another.

The depicted isolation valve 100 further comprises a valve closure in the form of a sliding blind or gate 4 having an aperture therein that is capable of aligning with openings 42 and 46 in an open position. Valve closure 4 slides back and forth in a linear, bi-directional manner between means for supporting a valve closure, shown in this exemplary embodiment as seat support system 50. Seat support system 50 may comprise any type of seating arrangement, including dual, independent seats, wherein the seats are both static, both floating and/or dynamic, or a combination of these. Seat support system 50 may alternatively comprise a single seat in support of valve closure 4, wherein the seat may comprise a static or floating or dynamic seat. In another exemplary embodiment, means for supporting a valve closure may dispense with a seating system in favor of a support system built into main body 16, such that one or more portions or components of main body 16 are selected and prepared to support valve closure 4. In some embodiments means for supporting a valve closure preferably comprises a metal contact surface that contacts and seals with a metal surface on valve closure 4, wherein this contact seal is maintained during the coke manufacturing process.

In some embodiments, valve closure 4 may be coupled to a drive shaft; preferably the valve closure 4 is coupled to clevis 6, which is in turn coupled to drive shaft 12. Drive shaft 12 is further coupled to actuating means that functions to power drive shaft 12 and cause valve closure 4 to oscillate between an open and closed position. Actuator means is preferably a hydraulically controlled power source contained within cylinder and that is capable of moving valve closure 4 through its linear, bi-directional cycle during a coking process, and specifically for the purpose of isolating the flow of fluids, gases and solids. In a closed position, valve closure 4 seals off the opening of a given line. Portions of gate 4 extend into upper chamber 32 in the closed position to allow the solid part of gate 4 to cover and close off the opening in the isolation valve. The contact seal created between the surface of valve closure 4 and means for supporting the valve closure (e.g., seat support system) is such that any accumulated coke on gate 4 is sheared off. Continued actuation causes valve closure 4 to relocate to a fully open position. In its fully open position, valve closure 4 is retracted into chamber 32, thus providing a clear flow path for the materials through a given line.

In one embodiment of the invention it is preferable that a continuous contact seal be created between valve closure 4 and means for supporting valve closure 50, such that during the back and forth sliding or rotation of valve closure 4 from an open position, to a semi-opened position, and finally to a closed position, with respect to the line, the created contact seal is never broken or breached, but its integrity is maintained at all times. This continuous contact seal is preferably a metal to metal contact seal that performs several functions and has several advantages. First, the contact seal creates, or at least contributes to, valve isolation, wherein an isolated environment is provided, such that no material is allowed to escape outside the sealed area and into the bonnets or other parts of the isolation valve, the area outside the isolation valve, or other areas. Various steam purge systems and containment systems also function to regulate pressure within the isolation valve, to contain the material within designated areas, and to maintain valve isolation. Second, the continuous contact seal helps to keep various components of the isolation valve clean and free of the product material as these materials are not allowed beyond the sealed area. Third, as a result of the load exerted upon valve closure 4 and resulting tight tolerances existing between valve closure 4 and upper and lower seats and the rotation of valve closure between upper and lower seats 50 causes a burnishing and polishing effect to occur.

In some embodiments, upper and lower seats 50, as well as valve closure 4 are made of metal, thus providing a metal to metal contact or metal to metal seal, or otherwise referred to as metal to metal seating of valve closure 4. The metal to metal seating increases the durability of the system as there are no non-metal parts, such as vinyl or rubber, used to seal the seats to valve closure 4. Metal to metal seating allows the system to achieve a higher consistency of sealing, while at the same time providing extended wear and durability. In addition, the metal to metal sealing allows the system, and specifically the sealing within the system, to be fine-tuned as needed.

Fourth, as the valve closure 4 is actuated and rotated from a closed position to an open position, the contact seal existing between the surface of valve closure 4 and the surface of means for supporting a valve closure functions to break up or shear the manufactured coke that has accumulated on or near the surface of valve closure 4. Other functions and advantages may be realized by one skilled in the art.

Figure 3:
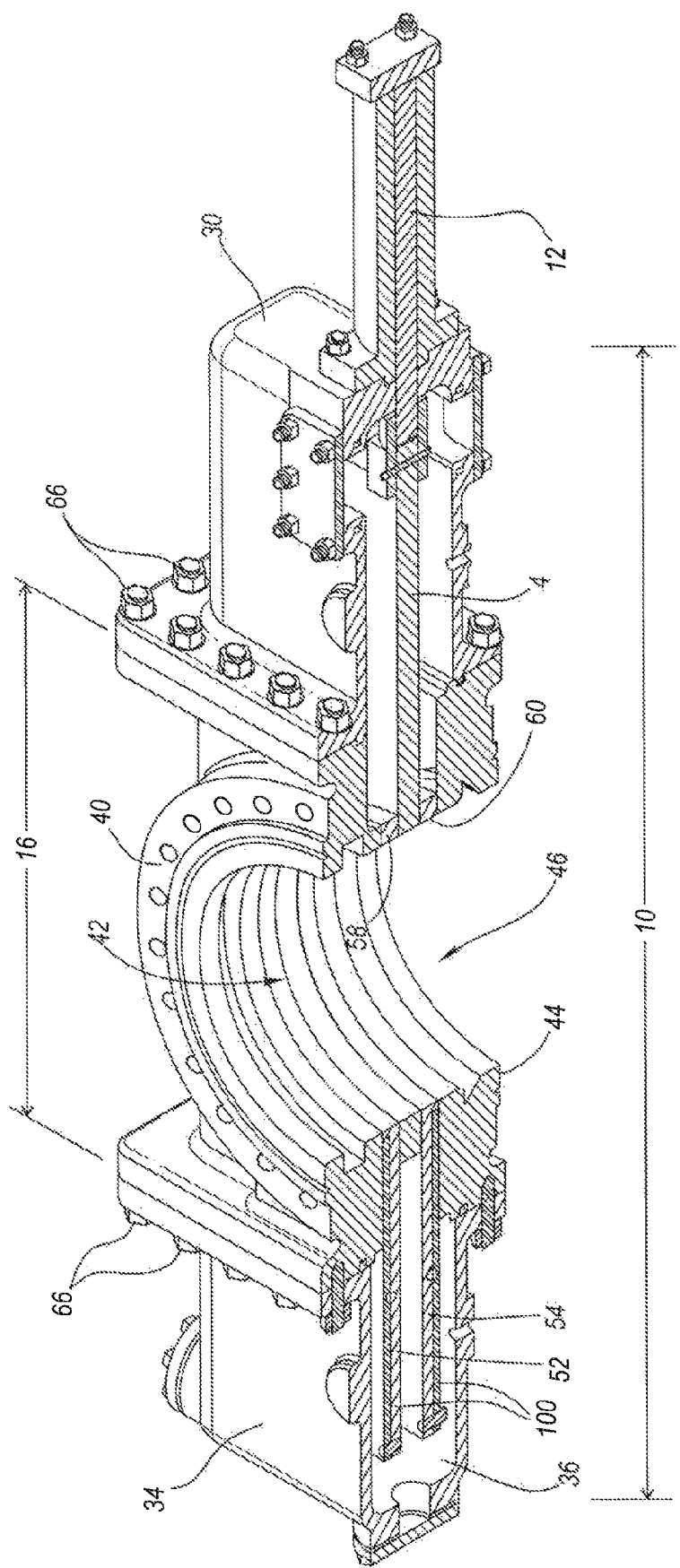
FIG. 3 illustrates a cutaway of some embodiments of the isolation valve of the present invention in an open position.
Figure 6A:
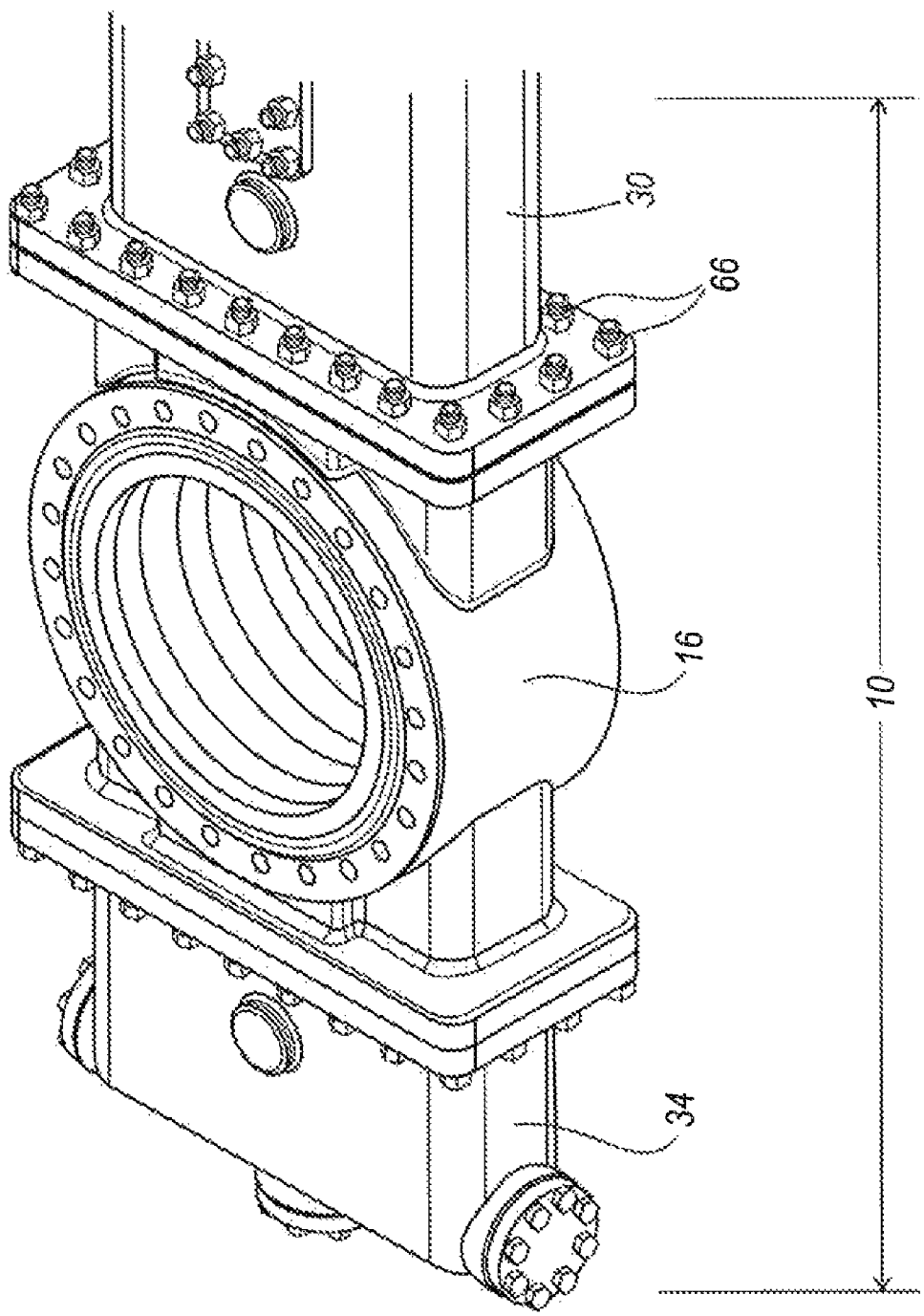
FIGS. 6A-I illustrate an embodiment of the method of removing internal components of the valve of the present invention.
Figure 6B:
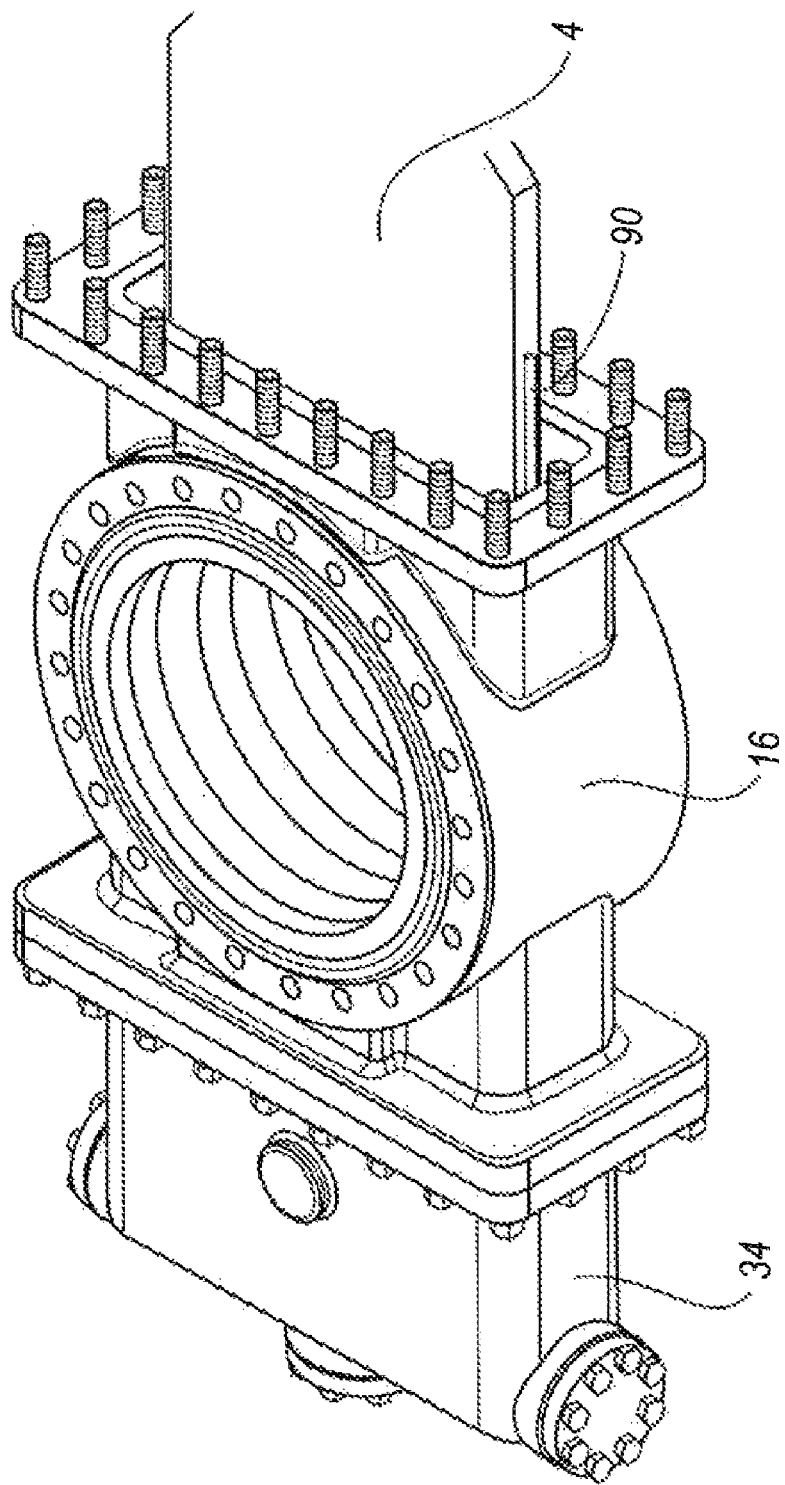
Figure 6C:
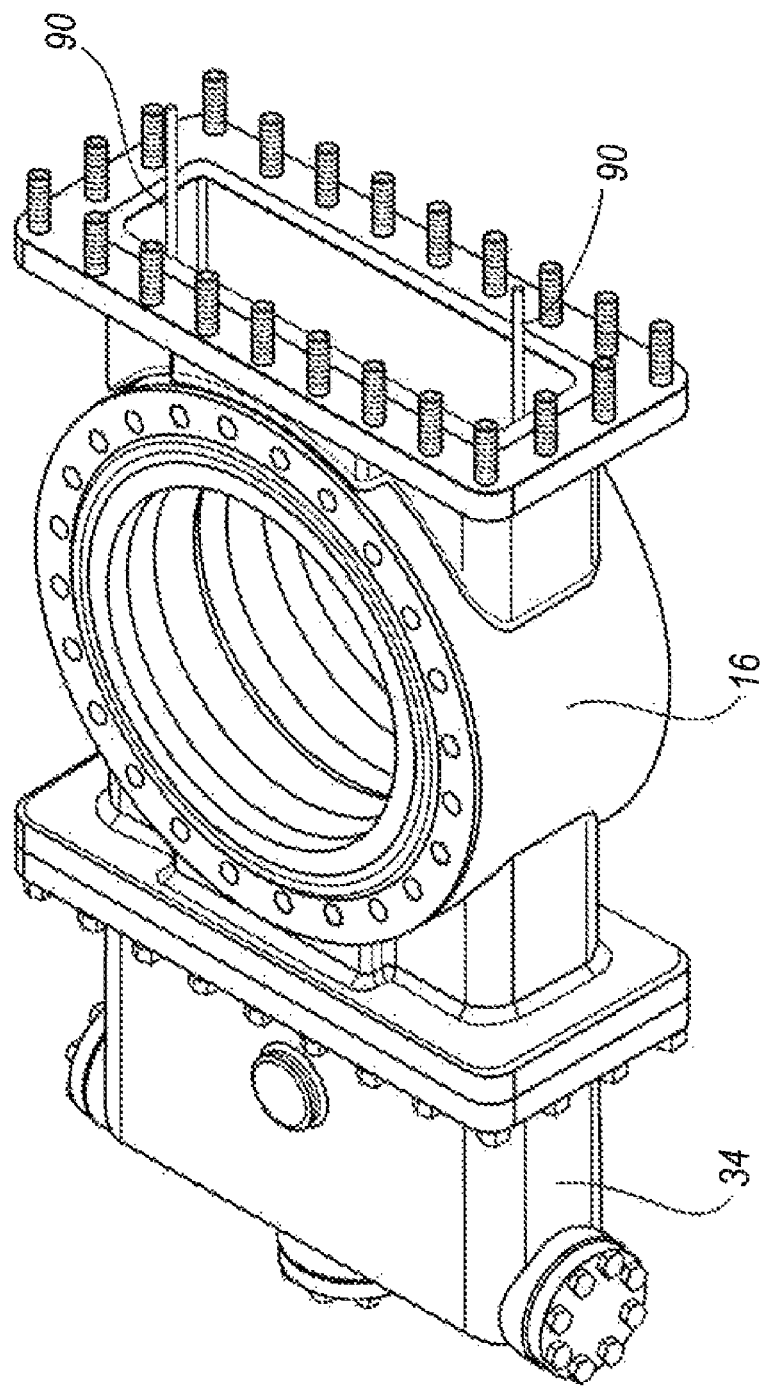
Figure 6D:
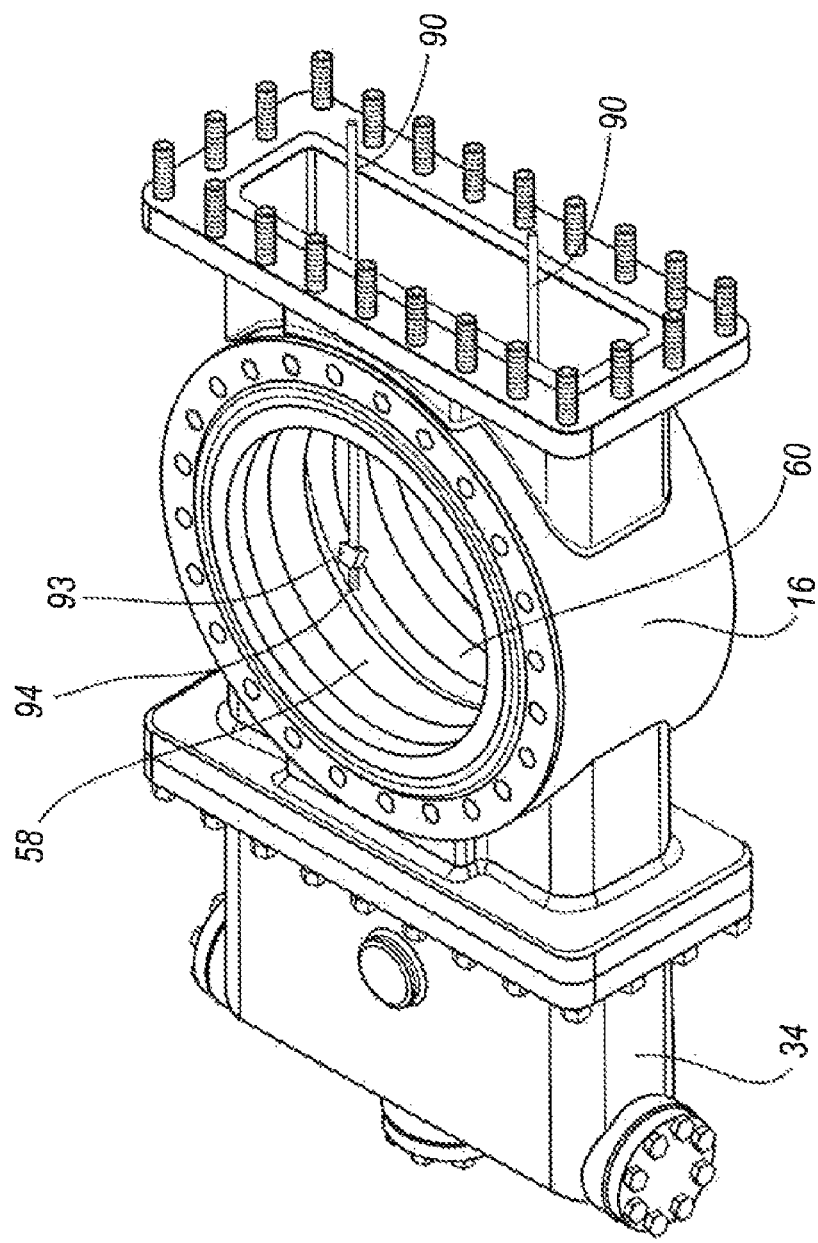
Figure 6E:
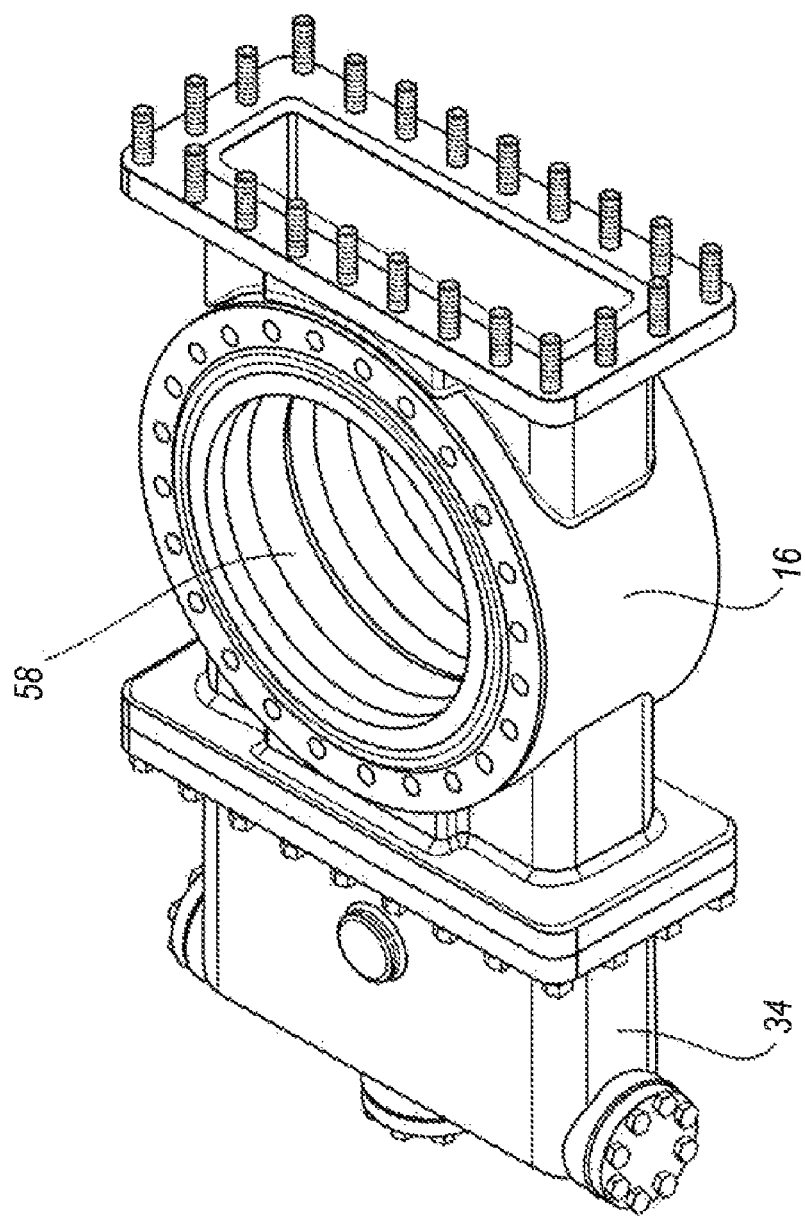
Figure 6F:
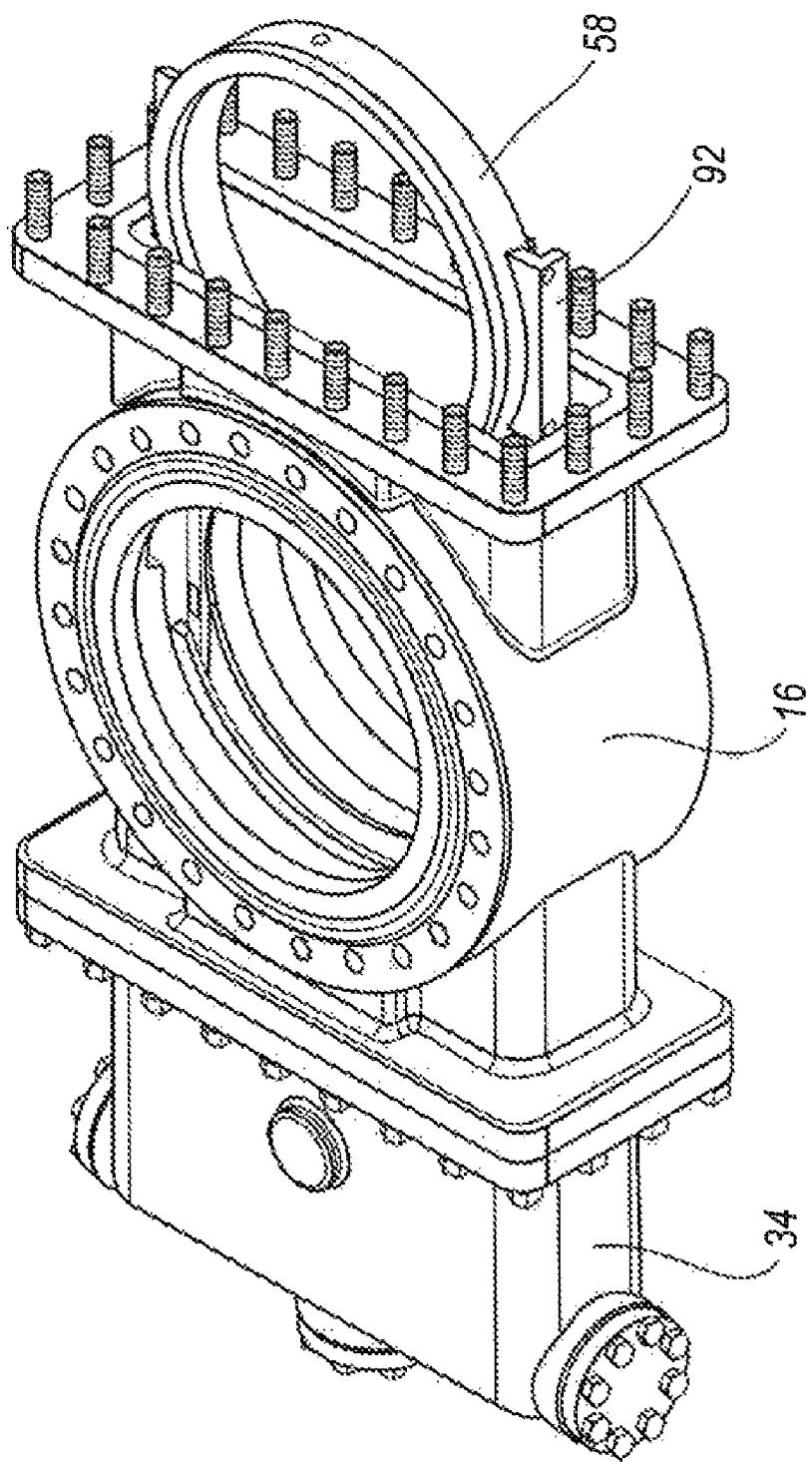
Figure 6G:
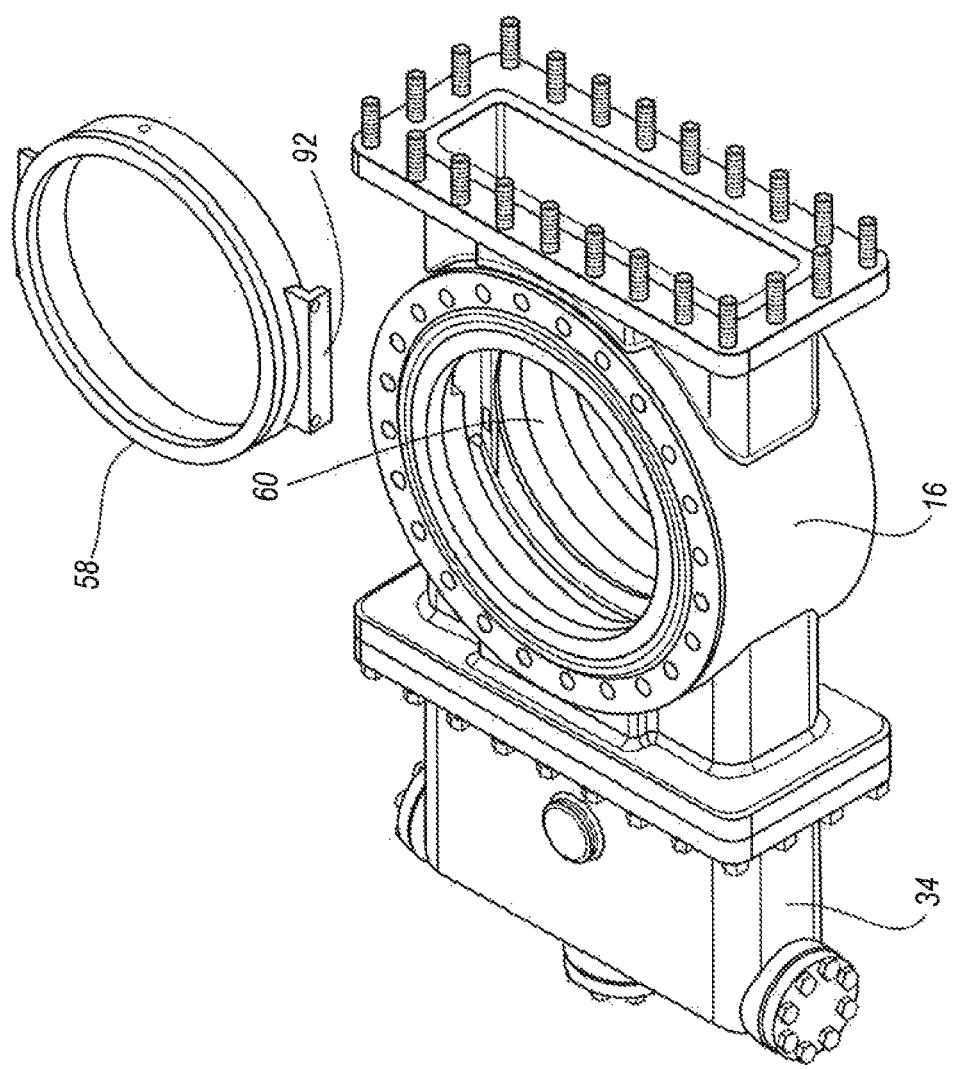
Figure 6H:
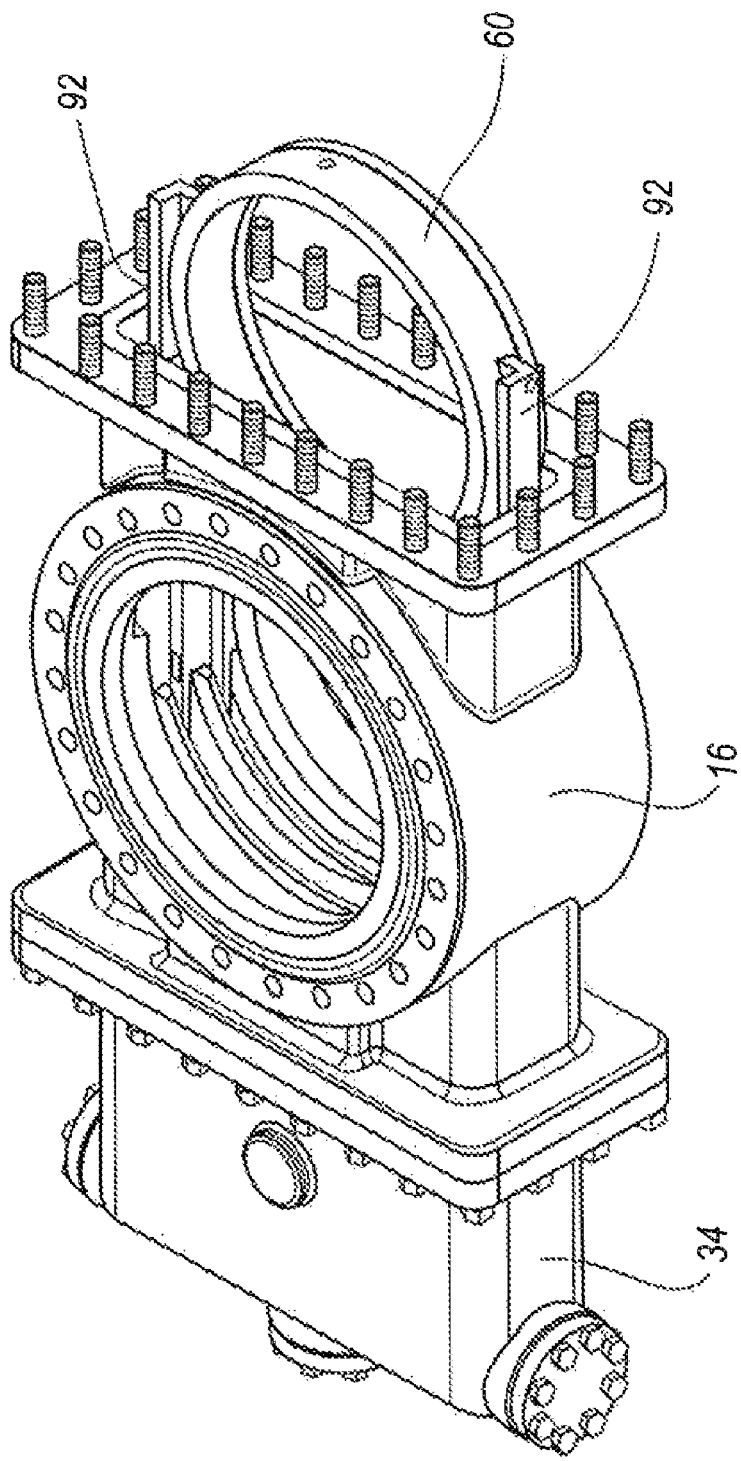
Figure 6I:
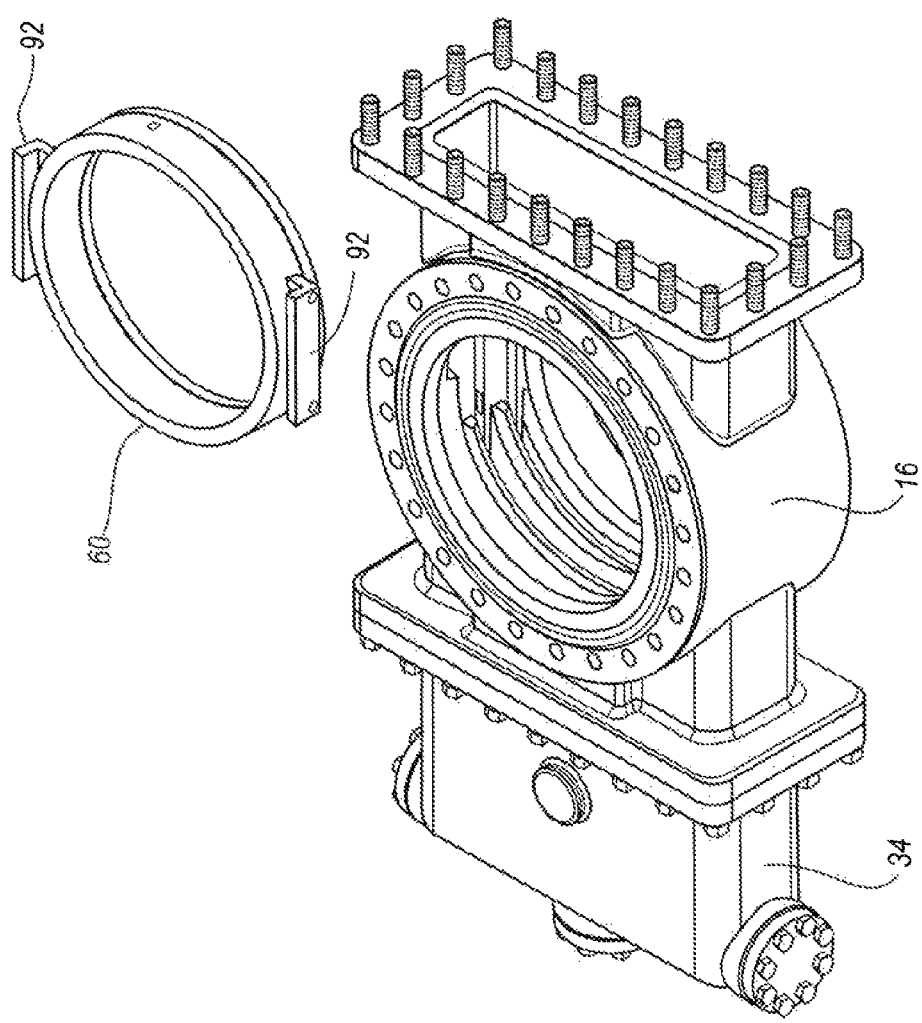

FIG. 3 depicts an isolation valve of the present invention in an open position. The elements of the isolation valve depicted in FIG. 3 are similar to those disclosed in FIG. 2. However, FIG. 3 demonstrates the valve closure when slid or rotated into a fully open position wherein the opening in the valve closure 4 is aligned with the opening in the first and second openings in the main body of the valve respectively 42 and 46.

FIG. 4 illustrates various elements of some embodiments of the isolation valve system of the present invention. FIG. 4 depicts the valve closure 4 in an open position. FIG. 4 depicts the slightly beveled end 98 of the valve closure system which inserts into the lower chamber 36 inside of the lower bonnet 34. The beveled edges 98 of the valve closure allow the valve closure to slide easily between two plates 52, 54. The two plates may be made from a variety of materials. In some embodiments, the two plates 52 and 54 are made from metal, and are preferably made from bronze or brass. The plates 52 and 54 are forced into contact with the valve closure 4. In some embodiments the plates 52 and 54 are forced into contact with the valve closure 4 by a spring actuated mechanism 56 which is loaded against the frame of the lower bonnet. In some embodiments the plates 52 and 54 are forced into contact with the valve closure 4 by a spring actuated mechanism 56 which is loaded against an internal shroud 100. In some embodiments the bonnet system comprising plates 52 and 54 provide a contact seal with the lower end of the valve closure, which prevent any gas or fluid materials from escaping into the lower bonnet of the valve closure system from the line. In some embodiments the first plate 52 and second plate 54 maintain a continuous seal with the valve closure 4 even when the valve closure is in a fully open position. That is in some embodiments a portion of the valve closure 4 remains inside of the lower bonnet as depicted in FIG. 5. It is also contemplated by the present invention that the plates 52 and 54 may also, or alternatively, be located in the chamber 35 located inside upper bonnet 33.

FIG. 5 illustrates various elements of the isolation valve system of the present invention. In particular FIG. 5 illustrates the first 53 and second 54 plate, relative to the valve closure 4 when the valve closure is in a closed position. Thus, FIG. 5 illustrates a valve closure 4, which has isolated or blocked the flow of any gas liquids and/or solids flowing through a line. FIG. 5 illustrates valve closure 4, a first plate 52, a second 54 and a spring actuated system 56. As illustrated, the opening in valve closure 4 is fully enclosed in the lower bonnet and is pressed between the upper plate 52 and the lower plate 54, thus maintaining an enclosed system which does not allow gas, liquids and/or solids to escape from the line into the bonnet.

FIGS. 4 and 5 additionally illustrate the relationship existing between the seat support system 50 which is comprised in some embodiments as depicted in the figures, of an upper seat 58 and a lower seat 60, the main body 16 of the isolation valve and the valve closure 4. As previously noted the seat system maintains contact with the valve closure 4 and prevents any gas, liquid and/or solid from moving into the upper or lower bonnet.

FIGS. 6A-I and 7A-E illustrate an embodiment of the method of removing internal components of the valve of the present invention The present inventions contemplates a simplified method for replacing the upper 58 and lower seats 60. As depicted in the figures of the present invention the method for replacing upper 58 and lower seats 60 comprises the steps of removing the attachment means 66 which attaches the upper bonnet 30 to the main body of the valve 16. Attachment means 66 are depicted as a nut and bolt system. While the nut and bolt system are a preferred embodiment, and thus depicted, it is contemplated by the invention that various attachment means may be utilized to couple the bonnets of the present invention to the main body. When the attachment means 66 have been removed, the upper bonnet 30 may be displaced or separated from the main body of the valve 16. When the upper bonnet 30 is separated from the main body of the valve 16, the upper and lower seats 58, 60 and gate 4 are exposed through an opening in the main body 16. Accordingly, in some embodiments the removal of the upper 30 or lower 34 bonnets allows the internal elements of the valve to be visually inspected by operators present in the area. Additionally, in some embodiments the removal of the upper 30 and the lower 34 bonnets allows a space through with various internal elements of the valve may be moved for the sake of repair, replacement or merely for inspection. In some embodiments the gate 4 may be removed through the space formerly occupied by the upper bonnet 30. In some embodiments the upper and lower seats 58, 60 may be removed one at a time and replaced by new seats through the space formerly occupied by the upper bonnet 30. Each of the seat types previously discussed are amenable to being removed from the valve through the space formerly occupied by the upper bonnet 30. Other elements contained within the valve system may likewise be inspected, repaired, removed and replaced through the opening created when the upper bonnet 30 is removed from being attached to the main body 16. In some embodiments of the present invention the main body of the valve 16 may remain coupled to a line and/or a vapor line while replacement of various parts is accomplished.

Figure 7A:
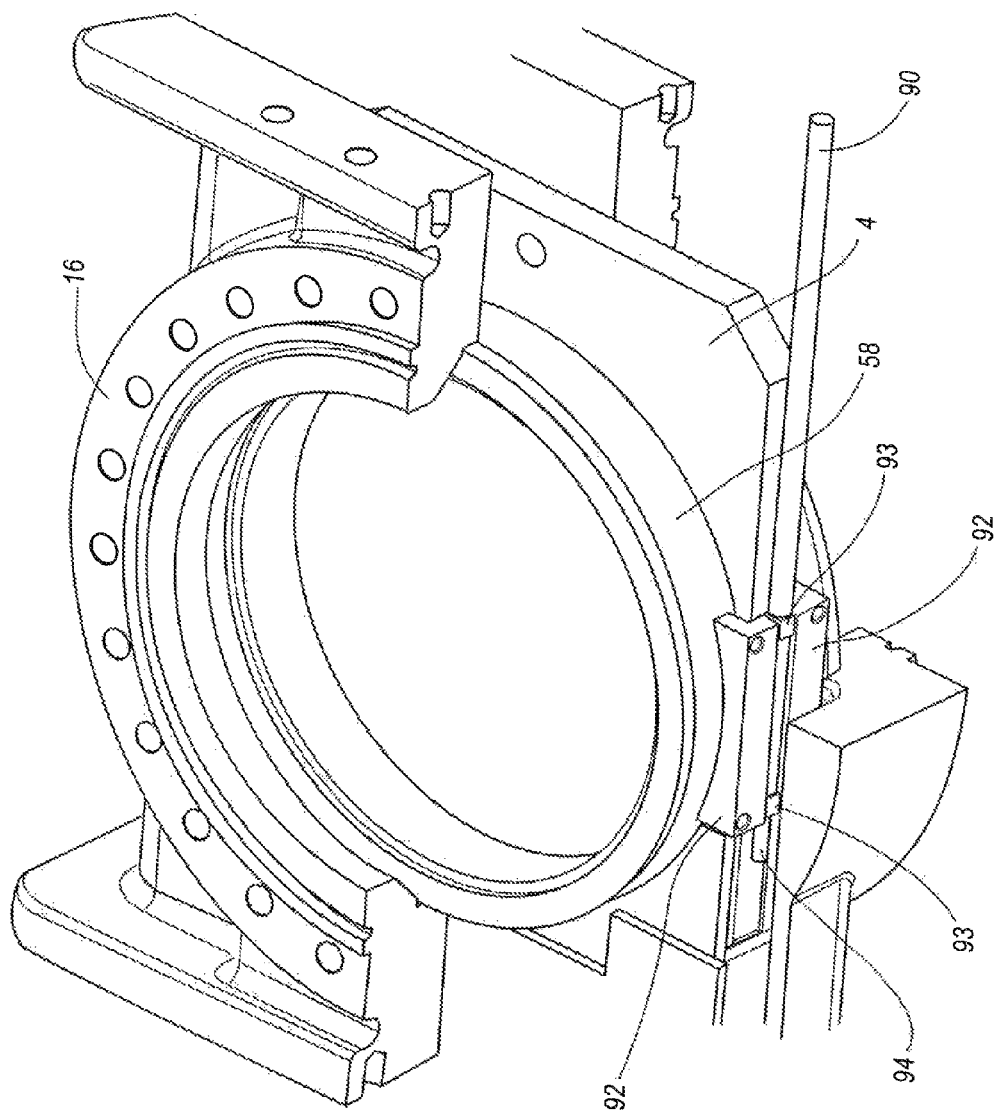
FIGS. 7A-E illustrate an embodiment of the system for removing internal elements of the valve of the present invention.
Figure 7B:
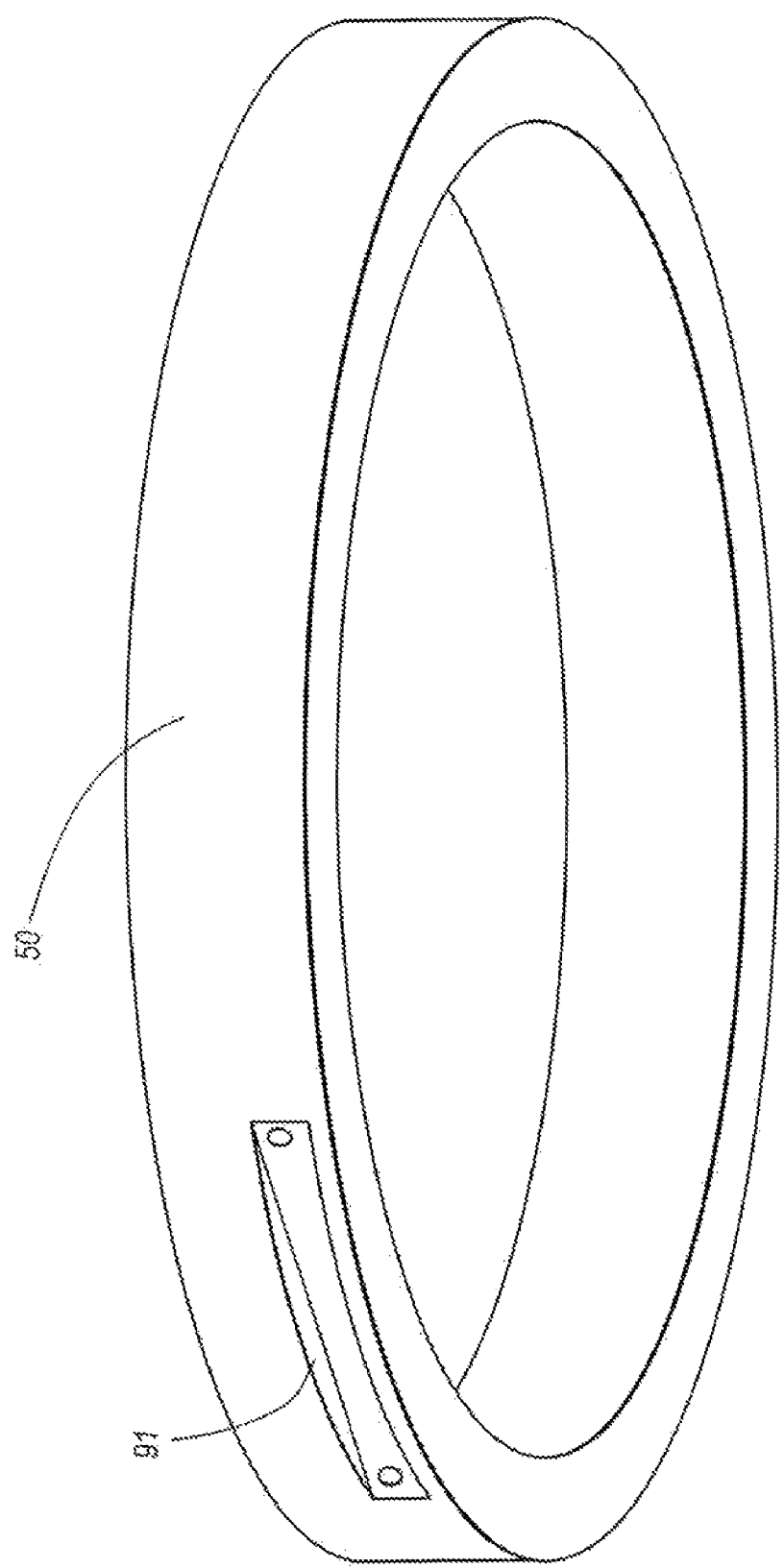
Figure 7C:
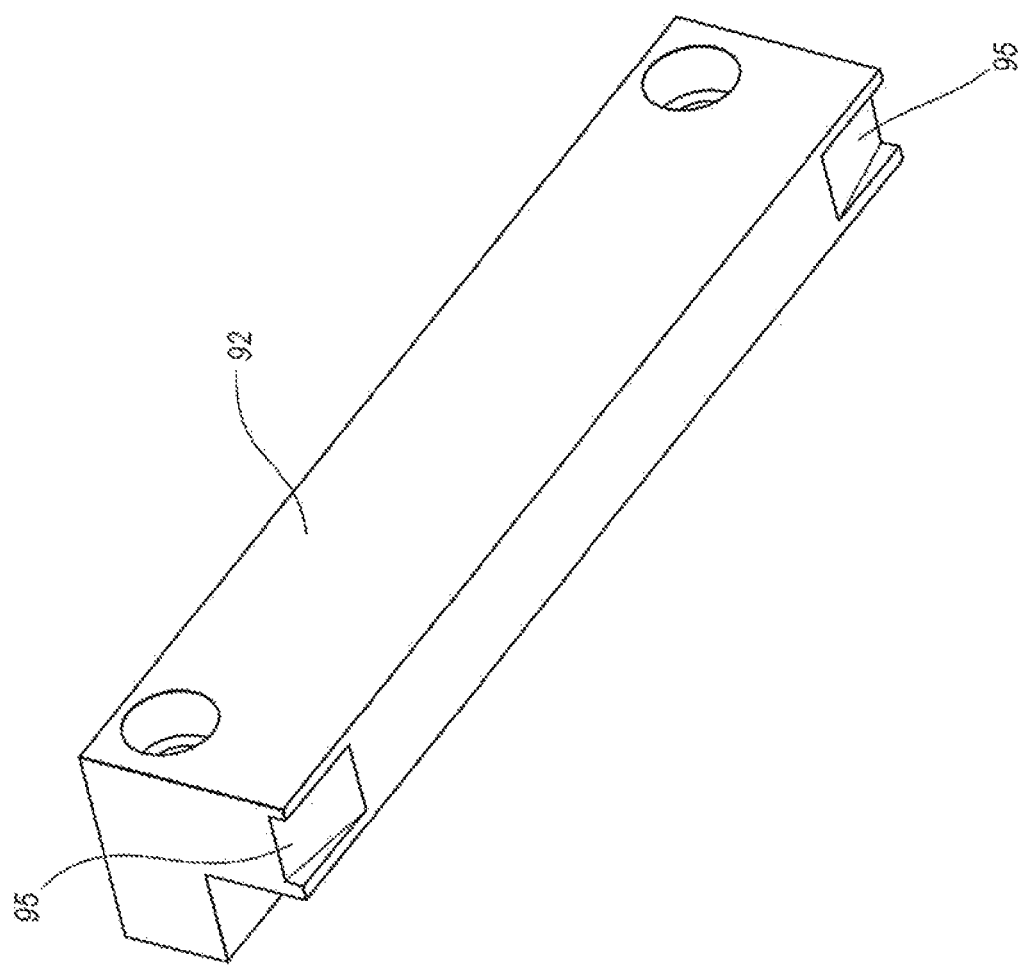
Figure 7D:
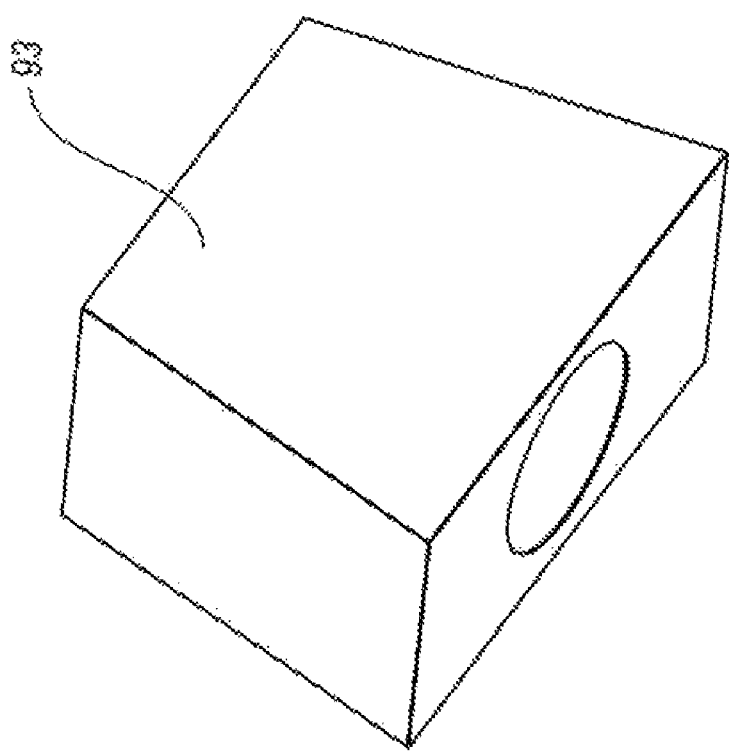
Figure 7E:
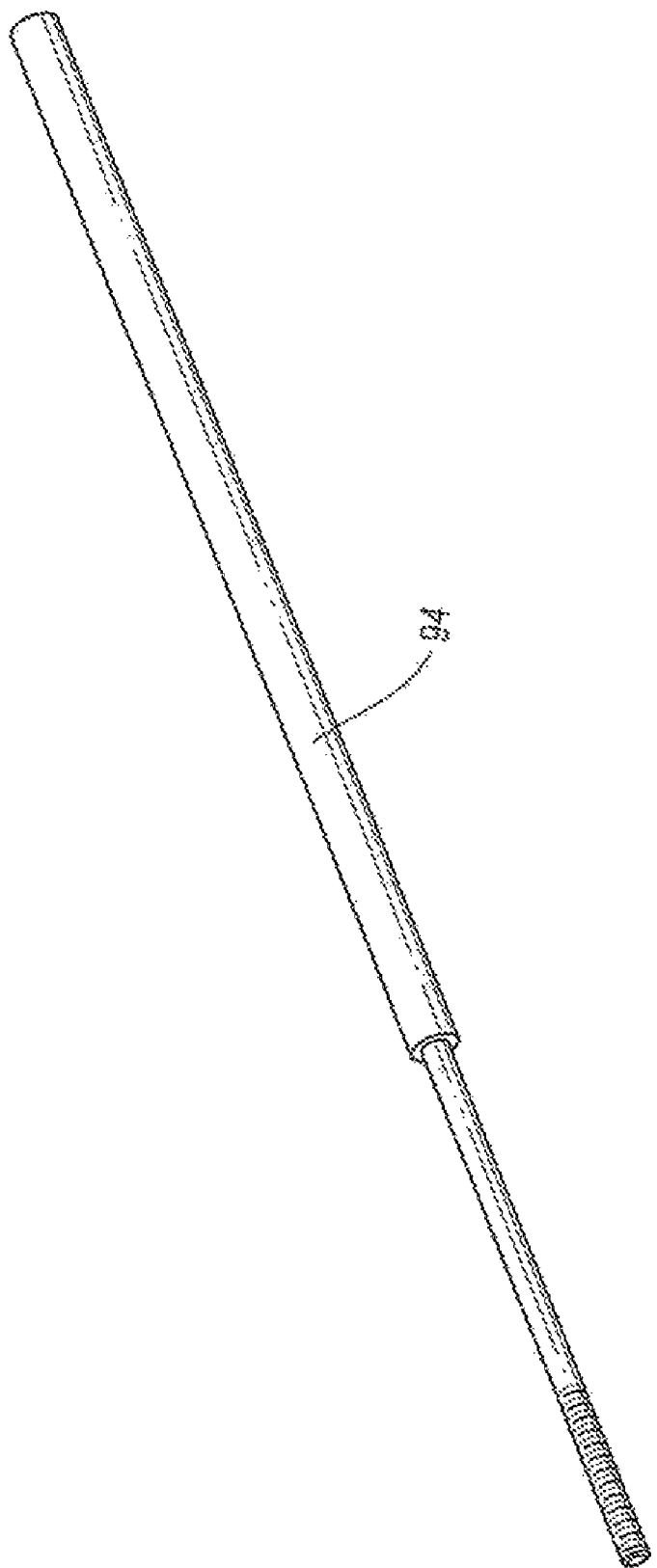

In some embodiments of the invention an extraction tool 90 is utilized in the method of removing internal elements of the valve. In some embodiments the seats 50 have a notch 91 to which a block 92 bolted. The extraction tool 90 interfaces with a slot 95 the block 92 which has been bolted to the seats 50. The extraction tool 90 is comprised of a wedge 93 and a threaded shaft 94. In some embodiments of the invention the extraction tool may further comprise a means for rotating the threaded shaft 96. In FIG. 7C the means for rotating the threaded shaft 96 is depicted as a six sided hex nut that could be rotated by a tool (e.g., a wrench) that would allow an operator to apply additional torque to the threaded shaft. In some embodiments of the invention the means for rotating the threaded shaft may be a handle coupled to the shaft (not depicted) or any other means of applying additional torque to the threaded shaft. The wedge 93 is operationally connected to or interacts with the block 92, which has been bolted to the seats such that when the threaded shaft 94 is turned in one direction the wedge 93 effectively dislodges the a seat 58, 60 from the main body of the valve 16, and if the threaded shaft 94 is turned in the opposite direction the wedge 93 helps to couple one or more seats 58, 60 to the main body 16 of the valve. Some embodiments of the valve may be assembled completely from the top. In some embodiments of the valve the extraction tool 90 remains in the valve without affecting the operation of the valve.

Figure 8A:
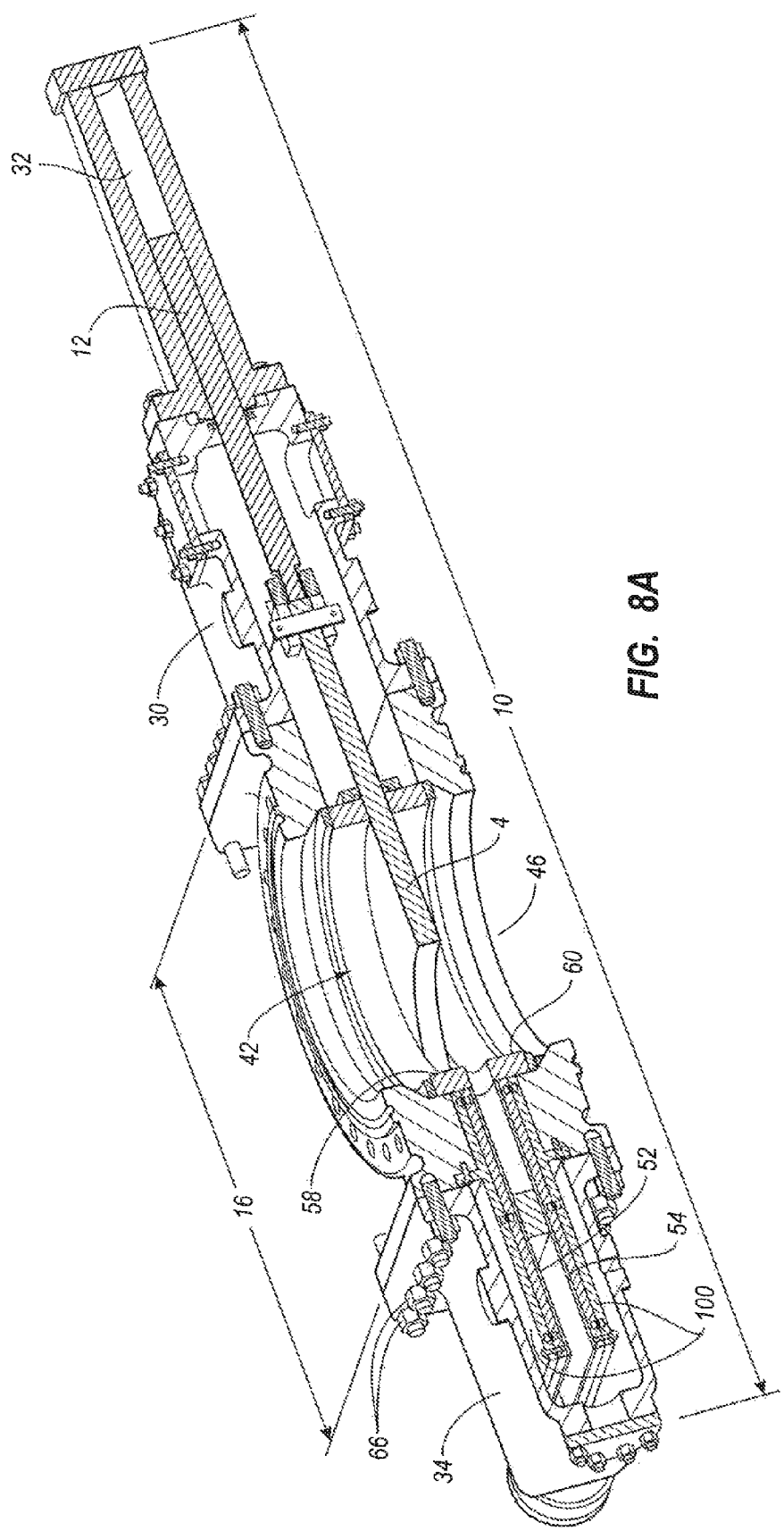
FIGS. 8A-C illustrate an embodiment of the isolation system in open, partially open and closed positions.
Figure 8B:
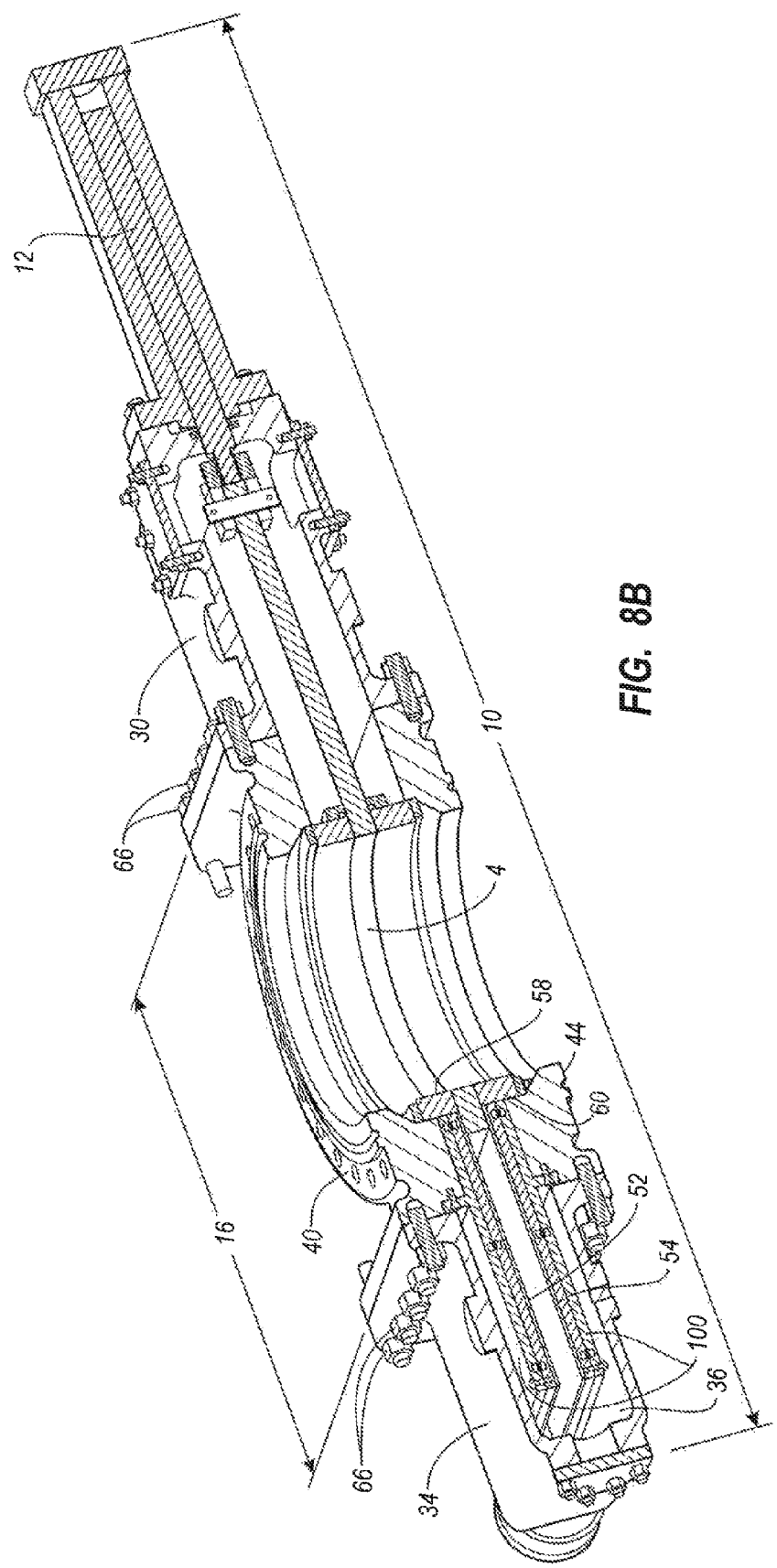
Figure 8C:
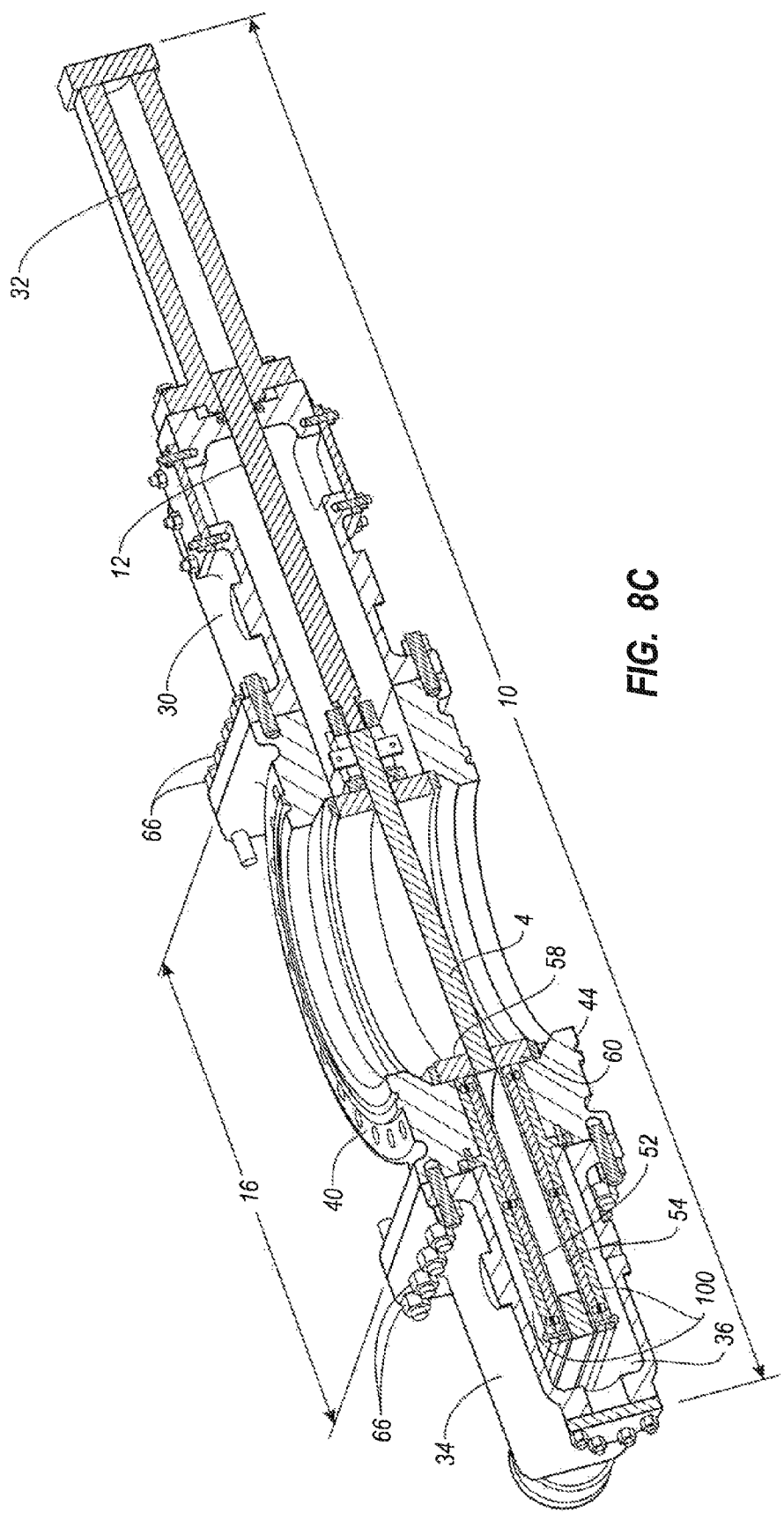

FIG. 8A illustrates a depiction of a cut away of a valve. As depicted in FIG. 8A when the threaded shaft 94 is turned in a clockwise direction the two wedges 93 depicted effectively move closer together. As the wedges 93 move closer together the wedged shaped surfaces of the wedge 93 interfaces with the slot 95 in the block 92 effectively moving the seats 58, 60 away from the blind and toward the main body 16 of the valve. Conversely, when the threaded shaft 94 is turned in a counter clockwise direction the two wedges 93 move apart. As the wedges 93 move apart, the wedged shaped surfaces of the wedges 93 interface the angled surface of the slot 95 in the block 92 moving the seats 58, 60 toward the blind 4 (or if the blind 4 has been removed into the space formerly occupied by the blind 4), and away from the main body 16 of the valve. It is contemplated by the present invention that the tool could be designed to be turned clockwise to move the seats 58, 60 toward the blind/space formerly occupied by the blind, and the tool could be designed to move the seats 58, 60 away from the blind 4 when turned in counterclockwise rotation.

The present invention contemplates the additional method of removing the lower bonnet 34 instead of the upper bonnet 30 as described above. Accordingly, the attachment means 66 which attach the lower bonnet 34 to the main body upper valve 16 may be removed and the lower bonnet slid away from the main valve body 16. In doing so, the elements of the valve system contained within the lower chamber 36 may be exposed for maintenance, repair or replacement. The present invention contemplates routine maintenance of the elements of the valve system. Accordingly, the methods disclosed above for maintaining, repairing or replacing various elements of the valve system leaving the main body of the valve couple to a line provides many benefits including the ability to safely and efficiently maintain the isolation valves of the present invention during prescheduled down times. The present invention contemplates benefits which include the ability to assess more accurately and rapidly, without the inconvenience of removing the valve from a line, detrimental effects caused by thermal transient stresses.

The present invention also contemplates a method for isolating the flow of a fluid, gas or solid in a line said method comprising the steps of: equipping a line with a isolation valve, said isolation valve coupled to said line and comprising: a main body having means for connecting said isolation valve to said line; a seat coupled to said main body; and a blind coupled to said main body and actuated by an actuator, said blind capable of moving in a substantially lateral bi-directional manner within said isolation valve adjacent to said seat to control the opening and closing of said isolation valve, said blind providing a seal between said seat and said blind; closing said blind and sealing said seat against said blind to seal said isolation valve blocking the flow of matter through the line; and opening said blind by actuating said blind and causing said blind to slide across said seat into an open position, allowing the flow of matter through the line.

In some embodiments of the invention the method of isolating the flow of matter in a line comprises the steps of: (a) equipping a line in the ethylene production unit operation with a isolation valve, the isolation valve being coupled to the line and itself comprising (1) a main body having an orifice dimensioned to align with said line when said isolation valve is coupled thereto; (2) a valve closure operably supported by said main body, said valve closure capable of being actuated to oscillate between an open and closed position with respect to said orifice and said port; (3) means for supporting said valve closure; (b) closing the valve closure, thus providing a contact seal between the valve closure and the means for supporting a valve closure; and (c) opening the line to allow matter to flow through the line by actuating the valve closure and causing it to move about the means for supporting a valve closure into an open position, the means for supporting a valve closure shearing any debris including coke and decoking by products from the blind and seats as the blind is displaced and thus effectively opening or re-opening the line. Be utilized on any line in a delay coker unit operation, and may additionally be utilized in other environments where selectively stopping the flow of matter through a line is desirable.

The present invention may be embodied in other specific forms without departing from its spirit of essential characteristics. The described embodiments are to be considered in all respects only al illustrative and not restrictive. The scope of the invention is, therefore, indicated by the appended claims, rather than by the foregoing description. All changes which come within the meaning and range of equivalency of the claims are to be embraced within their scope

We claim:

1. An ethylene production isolation valve system comprising:
    a main body having an orifice dimensioned to align with an orifice in an ethylene feed stock line, wherein said main body is coupled to said line;
    a first seat;
    a second seat aligned with said first seat, wherein one of said first seat and said second seat is a dynamic live-loaded seat,
    a blind;
    an upper bonnet and a lower bonnet coupled to said main body, wherein at least one of said upper bonnet and said lower bonnet may be removed in order to replace valve parts without separating the main body from the line; and
    a metal plate located inside one of said upper bonnet and said lower bonnet, wherein the plate comprises a planar surface forced into contact with the blind by a spring actuated mechanism.

2. The isolation system of claim 1, further comprising means for monitoring and controlling pressure existing within said isolation valve.

3. The isolation system of claim 1, wherein said blind is a biased, dual seated blind.

4. The isolation valve system of claim 1, wherein one of said first seat and said second seat is a static seat.

5. The isolation system of claim 1, further comprising an actuator which moves the blind through a bidirectional motion.

6. The isolation system of claim 5, wherein said actuator is controlled from a remote location to increase safety.

7. The isolation system of claim 5, wherein said actuator is selected from the group consisting of: a hydraulically controlled actuator, an electric actuator, a manual actuator, and a hydraulic actuator powered by electricity.

8. The isolation system of claim 1, further comprising: a second plate located inside one of said upper bonnet and said lower bonnet containing the first plate, wherein the second plate comprises a planar surface structured to contact another surface of the blind.

9. The isolation system of claim 8, further comprising additional plates, wherein the additional plates comprise a planar surface that may contact another surface of the blind.

10. The isolation system of claim 1, further comprising a flange structured to attach to said line and may remain attached to said line while other elements of the valve system are repaired or replaced.

11. The isolation system of claim 1, further comprising an extraction system structured to extract at least one of the seats through a space created when one of said upper bonnet and said lower bonnet is removed.

12. The isolation system of claim 11, wherein the extraction system further comprises a notch in seat; a block coupled to at least one of said first seat and said second seats; and an extraction tool structured to interact with the block to allow at least one of the first seat and the second seat to be removed from the main body through a space created by a removed bonnet.

13. The isolation system of claim 12, wherein the extraction tool comprises: a wedge connected to a threaded shaft.

14. An isolation valve system comprising:
    a main body comprising an orifice dimensioned to align with an orifice in an ethylene feed stock line, wherein said main body is coupled to said line;
    an upper bonnet and a lower bonnet coupled to said main body, wherein at least one of said upper bonnet and said lower bonnet may be removed in order to replace valve parts without separating the main body from the line;
    a first seat;
    a second seat aligned with said first seat,
    a blind;
    an extraction system comprising a shaft structured to interact with one of said first seat and said second seat to extract at least one of said first seat and said second seat through a space created when one of said bonnet is removed; and
    wherein the extraction system comprises a notch in at least one of said first seat and said second seat; a block coupled to at least one of the seats; and an extraction tool structured to interact with the block to allow at least one of the seats to be removed from the main body through a space created by a removed bonnet.

15. The isolation system of claim 14, further comprising a plate located inside one of said upper bonnet and said lower bonnet, wherein the plate comprises a planar surface that contacts a surface of the blind.

16. The isolation system of claim 14, further comprising means for monitoring and controlling pressure existing within said isolation valve.

17. An ethylene production isolation valve system comprising:
- a main body having an orifice dimensioned to align with an orifice in an ethylene feed stock line, wherein said main body is coupled to said line;
- a blind;
- an upper bonnet and a lower bonnet coupled to said main body; and
- a plate located inside one of said upper bonnet and said lower bonnet, wherein the plate comprises a planar surface forced into contact with the blind by a spring actuated mechanism that contacts a surface of the blind.

18. The isolation system of claim 17, further comprising means for monitoring and controlling pressure existing within said isolation valve.

19. The isolation system of claim 17, further comprising a first seat;
and a second seat aligned with the first seat.

20. The isolation valve system of claim 17, one of a static first seat and a static second seat.

21. The isolation system of claim 17, further comprising an actuator which moves the blind through a bidirectional motion.

22. The isolation system of claim 21, wherein said actuator is controlled from a remote location to increase safety.

23. The isolation system of claim 21, wherein said actuator is selected from the group consisting of: a hydraulically controlled actuator, an electric actuator, a manual actuator, and a hydraulic actuator powered by electricity.

24. The isolation system of claim 17, further comprising: a second plate located inside one of said upper bonnet and said lower bonnet containing the first plate, wherein the second plate comprises a planar surface structured to contact another surface of the blind.

25. The isolation system of claim 24, further comprising additional plates, wherein the additional plates comprise a planar surface that may contact another surface of the blind.

26. The isolation system of claim 17, further comprising a flange structured to attach to said line and may remain attached to said line while other elements of the valve system are repaired or replaced.

27. The isolation system of claim 17, further comprising a first seat; a second seat and an extraction system structured to extract at least one of the seats created when one of said upper bonnet and said lower bonnet is removed wherein the extraction system further comprises a notch in seat; a block coupled to at least one of said first seat and said second seats; and an extraction tool structured to interact with the block to allow at least one of the first seat and the second seat to be removed from the main body through a space created by a removed bonnet.

28. The isolation system of claim 27, wherein the extraction tool comprises: a wedge connected to a threaded shaft.

* * * * *